(12) United States Patent
Kawabata

(10) Patent No.: US 9,191,455 B2
(45) Date of Patent: Nov. 17, 2015

(54) IMAGE FORMING APPARATUS FOR BEING ABLE TO UTILIZE APPLICATION IN WHICH WEB BROWSER IS USED

(75) Inventor: Hiroyuki Kawabata, Kawanishi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 33 days.

(21) Appl. No.: 13/371,896

(22) Filed: Feb. 13, 2012

(65) Prior Publication Data

US 2012/0206757 A1 Aug. 16, 2012

(30) Foreign Application Priority Data

Feb. 15, 2011 (JP) ................................. 2011-029763

(51) Int. Cl.
| | | |
|---|---|---|
| G06K 15/00 | (2006.01) | |
| H04L 29/08 | (2006.01) | |
| G03G 15/00 | (2006.01) | |

(52) U.S. Cl.
CPC ............ *H04L 67/289* (2013.01); *G03G 15/502* (2013.01); *G03G 15/5091* (2013.01); *H04L 67/02* (2013.01); *H04L 67/2852* (2013.01); *G03G 2215/00109* (2013.01)

(58) Field of Classification Search
CPC ....... G06F 15/16; H04L 67/289; H04L 67/02; H04L 67/2852
USPC ................................................ 358/1.13–1.15
See application file for complete search history.

(56) References Cited

U.S. PATENT DOCUMENTS

| 6,968,539 | B1 * | 11/2005 | Huang et al. ................... 717/115 |
| 8,181,016 | B1 * | 5/2012 | Borgia et al. .................. 713/156 |
| 2004/0196491 | A1 * | 10/2004 | Uchino ......................... 358/1.15 |
| 2006/0031833 | A1 * | 2/2006 | Huang et al. ................... 717/178 |
| 2008/0150952 | A1 * | 6/2008 | Koarai ........................... 345/531 |
| 2010/0122247 | A1 * | 5/2010 | Ikeda ............................. 717/174 |
| 2012/0030585 | A1 * | 2/2012 | Akuzawa ....................... 715/747 |

FOREIGN PATENT DOCUMENTS

| JP | 11-316727 A | 11/1999 |
| JP | 2002-259430 | 9/2002 |
| JP | 2003-248637 | 9/2003 |
| JP | 2009-070373 A | 4/2009 |
| JP | 2009-110216 A | 5/2009 |
| WO | 02/061572 A1 | 8/2002 |

OTHER PUBLICATIONS

Notification of Grounds of Rejection issued in corresponding Japanese Patent Application No. 2011-029763, mailed May 28, 2013, and English translation thereof.

\* cited by examiner

*Primary Examiner* — Marivelisse Santiago Cordero
*Assistant Examiner* — Kevin Ky
(74) *Attorney, Agent, or Firm* — Buchanan Ingersoll & Rooney PC

(57) ABSTRACT

An image forming apparatus registers a Web application provided by a server. When receiving an instruction to select the registered Web application, the image forming apparatus acquires information for performing the Web application in response to the received selection instruction, and stores the information as cache information. When receiving an instruction to cancel the registration of the Web application, the image forming apparatus cancels the registration of the Web application in response to the received instruction, and deletes the cache information corresponding to the Web application in which the registration is cancelled in the stored pieces of cache information.

2 Claims, 15 Drawing Sheets

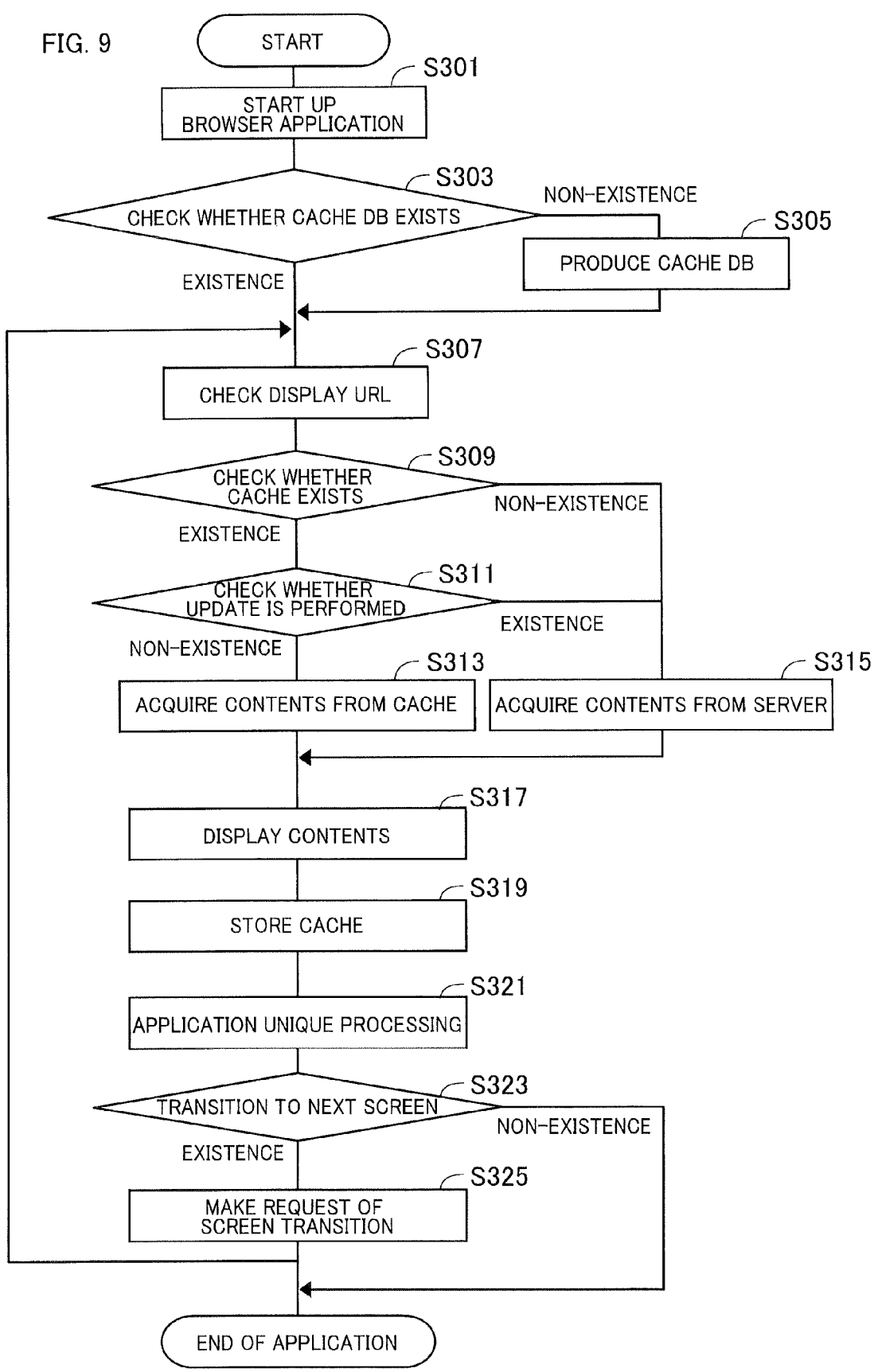

FIG. 10

| FILE NAME | URL | APPLICATION NUMBER | VALIDATED DATE |
|---|---|---|---|
| www.google.co.jp/ | http://www.google.co.jp/ | – | NON-EXISTENCE |
| app1.html | http://www.app.com/bbb/app1.html | 1 | NON-EXISTENCE |
| 0.gif | http://www.aaa.com/bbb/image/0.gif | 1 | 2010/09/30 |
| 1.gif | http://www.aaa.com/bbb/image/1.gif | 1 | 2010/09/30 |
| 2.gif | http://www.aaa.com/bbb/image/2.gif | 1 | 2010/09/30 |
| logo.jpg | http://www.aaa.com/bbb/image/logo.jpg | 1 | 2010/09/30 |
| app2.html | http://www.ddd.com/eee/app2.html | 2 | NON-EXISTENCE |
| 0.gif | http://www.ddd.com/eee/fff/0.gif | 2 | 2010/10/30 |
| 1.gif | http://www.ddd.com/eee/fff/1.gif | 2 | 2010/10/30 |
| 2.gif | http://www.ddd.com/eee/fff/2.gif | 2 | 2010/10/30 |
| Name.jpg | http://www.ddd.com/eee/fff/name.jpg | 2 | 2010/10/30 |

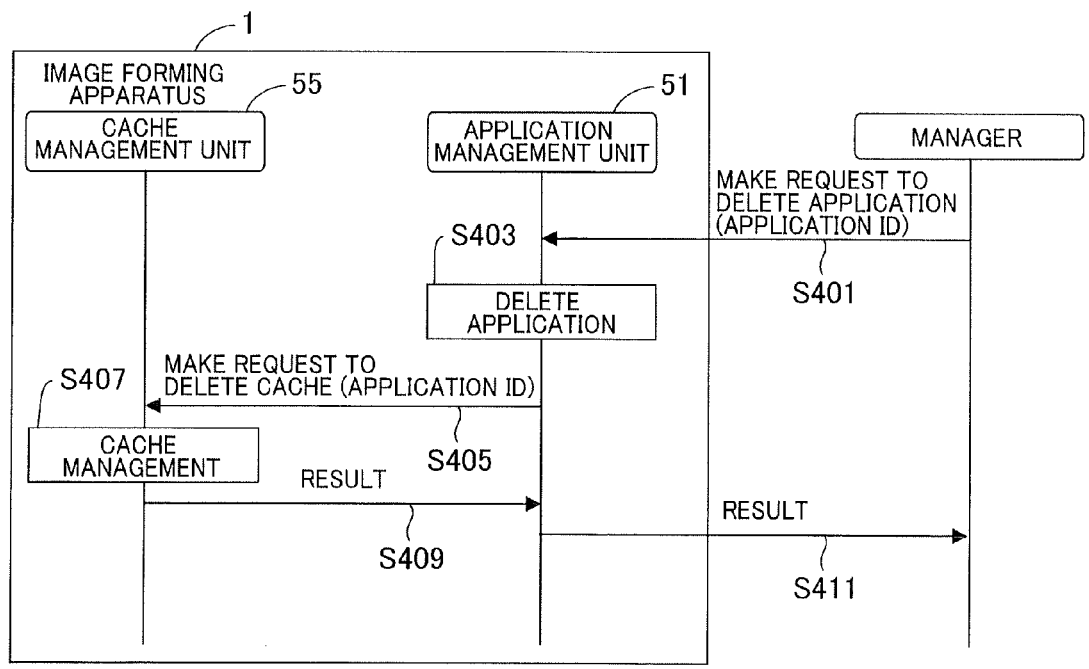

FIG. 11

| FILE NAME | URL | APPLICATION NUMBER | VALIDATED DATE |
|---|---|---|---|
| www.google.co.jp/ | http://www.google.co.jp/ | – | NON-EXISTENCE |
| app2.html | http://www.ddd.com/eee/app2.html | 2 | NON-EXISTENCE |
| 0.gif | http://www.ddd.com/eee/fff/0.gif | 2 | 2010/10/30 |
| 1.gif | http://www.ddd.com/eee/fff/1.gif | 2 | 2010/10/30 |
| 2.gif | http://www.ddd.com/eee/fff/2.gif | 2 | 2010/10/30 |
| Name.jpg | http://www.ddd.com/eee/fff/name.jpg | 2 | 2010/10/30 |

FIG. 15

| USER ID | FILE NAME | URL | APPLICATION NUMBER | VALIDATED DATE |
|---|---|---|---|---|
| 1 | www.google.co.jp/ | http://www.google.co.jp/ | - | NON-EXISTENCE |
| 1 | app1.html | http://www.app.com/bbb/app1.html | 1 | NON-EXISTENCE |
| 1 | 0.gif | http://www.aaa.com/bbb/image/0.gif | 1 | 2010/09/30 |
| 1 | 1.gif | http://www.aaa.com/bbb/image/1.gif | 1 | 2010/09/30 |
| 1 | 2.gif | http://www.aaa.com/bbb/image/2.gif | 1 | 2010/09/30 |
| 1 | logo.jpg | http://www.aaa.com/bbb/image/logo.jpg | 1 | 2010/09/30 |
| 1 | app2.html | http://www.ddd.com/eee/app2.html | 2 | NON-EXISTENCE |
| 1 | 0.gif | http://www.ddd.com/eee/fff/0.gif | 2 | 2010/10/30 |
| 1 | 1.gif | http://www.ddd.com/eee/fff/1.gif | 2 | 2010/10/30 |
| 1 | 2.gif | http://www.ddd.com/eee/fff/2.gif | 2 | 2010/10/30 |
| 1 | Name.jpg | http://www.ddd.com/eee/fff/name.jpg | 2 | 2010/10/30 |
| 2 | www.google.co.jp/ | http://www.google.co.jp/ | - | NON-EXISTENCE |
| 2 | app1.html | http://www.app.com/bbb/app1.html | 1 | NON-EXISTENCE |
| 2 | 0.gif | http://www.aaa.com/bbb/image/0.gif | 1 | 2010/09/30 |
| 2 | 1.gif | http://www.aaa.com/bbb/image/1.gif | 1 | 2010/09/30 |
| 2 | 2.gif | http://www.aaa.com/bbb/image/2.gif | 1 | 2010/09/30 |
| 2 | logo.jpg | http://www.aaa.com/bbb/image/logo.jpg | 1 | 2010/09/30 |

FIG. 18

| USER ID | FILE NAME | URL | APPLICATION NUMBER | VALIDATED DATE |
|---|---|---|---|---|
| 1 | www.google.co.jp/ | http://www.google.co.jp/ | - | NON-EXISTENCE |
| 1 | app2.html | http://www.ddd.com/eee/app2.html | 2 | NON-EXISTENCE |
| 1 | 0.gif | http://www.ddd.com/eee/fff/0.gif | 2 | 2010/10/30 |
| 1 | 1.gif | http://www.ddd.com/eee/fff/1.gif | 2 | 2010/10/30 |
| 1 | 2.gif | http://www.ddd.com/eee/fff/2.gif | 2 | 2010/10/30 |
| 1 | Name.jpg | http://www.ddd.com/eee/fff/name.jpg | 2 | 2010/10/30 |
| 2 | www.google.co.jp/ | http://www.google.co.jp/ | - | NON-EXISTENCE |
| 2 | app1.html | http://www.app.com/bbb/app1.html | 1 | NON-EXISTENCE |
| 2 | 0.gif | http://www.aaa.com/bbb/image/0.gif | 1 | 2010/09/30 |
| 2 | 1.gif | http://www.aaa.com/bbb/image/1.gif | 1 | 2010/09/30 |
| 2 | 2.gif | http://www.aaa.com/bbb/image/2.gif | 1 | 2010/09/30 |
| 2 | logo.jpg | http://www.aaa.com/bbb/image/logo.jpg | 1 | 2010/09/30 |

# IMAGE FORMING APPARATUS FOR BEING ABLE TO UTILIZE APPLICATION IN WHICH WEB BROWSER IS USED

This application is based on Japanese Patent Application No. 2011-029763 filed with the Japan Patent Office on Feb. 15, 2011, the entire content of which is hereby incorporated by reference.

BACKGROUND OF THE INVENTION

1. Field of the Invention

The present invention relates to an image forming apparatus and an image forming system, particularly to an image forming apparatus and an image forming system for being able to utilize an application in which a Web browser is used.

2. Description of the Related Art

There is known an image forming system including an image forming apparatus (such as an MFP (Multi-Function Peripheral) including a scanner function, a facsimile function, a printer function, a data communication function, and a server function, a facsimile machine, a copying machine, and a printer, and the like) and a Web server that provides a Web application. In the image forming system, the Web application provided by the Web server can be utilized using the image forming apparatus by accessing the Web server from the image forming apparatus.

In some image forming apparatuses of the image forming system, the Web application that is frequently utilized in utilized Web applications can be registered in the image forming apparatus. In the image forming apparatus, the Web application can easily be utilized by registering the Web application. The Web application and cache information on the Web application are stored in the image forming apparatus, which allows the Web application to be quickly utilized. Additionally, a traffic of a network constituting the image forming system can be reduced in utilizing the Web application.

During the use of the Web application, the image forming apparatus acquires data utilized when using the Web application (for example, document data or image data of a Web page) from the Web server similarly to a usual browse of the Web page. At this point, the acquired data is stored as the cache information in the image forming apparatus. Since then, in the case that the image forming apparatus accesses the same Web page, the cache information is utilized when the stored cache information can be utilized, the Web page relating to the Web application is displayed to enable the Web application to be utilized.

Japanese Patent Laying-Open No. 2009-110216 discloses a server-based computing system, in which an important degree of a frequently-browsed URL is assigned to give a priority in each Web page and the cache information on the Web page having the low priority is deleted when a domain of a cache memory needs to be ensured.

Japanese Patent Laying-Open No. 2009-070373 discloses a communication apparatus, in which application software is received and executed for the purpose of trial use and information on the application software, which is stored in a non-volatile memory, is deleted after Web browser software is executed.

Japanese Patent Laying-Open No. H11-316727 discloses a security system in which data of a security target is deleted from a disk cache when a WWW browser software is ended.

Conventionally, unless the cache information on the Web application is deleted in accordance with a manual manipulation of a user, the cache information is retained in the image forming apparatus for an indefinite time or a predetermined time. Therefore, in the image forming apparatus in which the Web application can be registered, the cache information remains retained even if the registration of the Web application retained in the image forming apparatus is cancelled.

When the unnecessary cache information remains retained, a free space is reduced in a storage (such as an HDD (Hard Disk Drive) and a memory) of the image forming apparatus. For example, it is necessary to use the storage having a large capacity in order to store necessary information as much as possible. However, the use of the storage having the large capacity increases production cost of the image forming apparatus. The capacity of the storage can be ensured when the unnecessary cache information is intentionally deleted. However, necessity of an explicit deletion manipulation increases a manipulation burden of the user. The capacity of the storage can be ensured when the cache information is deleted in a short time irrespective of the cache information. However, in this case, it is necessary to acquire the cache information from the Web server again when the Web application that remains registered is utilized next time. Therefore, convenience is degraded during the use of the Web application.

Japanese Patent Laying-Open Nos. 2009-110216, 2009-070373, and H11-316727 disclose no effective countermeasure against the problem of the cache information associated with the cancel of the registration of the Web application.

SUMMARY OF THE INVENTION

The invention is devised in order to solve the above problems, and an object of the invention is to provide an image forming apparatus and an image forming system for being able to easily delete the unnecessary cache information on the Web application.

According to one aspect of the invention, an image forming apparatus for accessing a server providing a Web application to enable the Web application to be utilized, the image forming apparatus includes: a registration unit for registering the Web application provided by the server; a selection receiver for receiving an instruction to select the Web application registered by the registration unit; an acquisition unit for acquiring information for performing the Web application in response to the selection instruction received by the selection receiver; a storage in which the information acquired by the acquisition unit is stored as cache information; a cancel receiver for receiving an instruction to cancel the registration of the Web application; a registration cancelling unit for cancelling the registration of the Web application in response to the instruction received by the cancel receiver; and a deletion unit for deleting the cache information corresponding to the Web application in which the registration is cancelled by the registration cancelling unit in the pieces of cache information stored in the storage.

According to another aspect of the invention, an image forming apparatus that accesses a server providing a Web application to enable the Web application to be utilized, the image forming apparatus includes: a user identification unit for identifying a user who uses the image forming apparatus; a registration unit for registering the Web application provided by the server; a selection receiver for receiving an instruction to select the Web application registered by the registration unit; an acquisition unit for acquiring information for performing the Web application in response to the selection instruction received by the selection receiver; a storage in which the information acquired by the acquisition unit is stored as cache information; a cache management unit for managing information indicating a correspondence relationship between the cache information stored in the storage and the Web application for each user identified by the user identification unit; an authority management unit for performing management relating to use authority of the user identified by the user identification unit; and a deletion unit for deleting the cache information that corresponds to the Web application in which the use authority is cancelled and corresponds to the user in whom the use authority is cancelled in pieces of cache information stored in the storage based on the information managed by the cache management unit when the authority management unit cancels the use authority that is provided to the user with respect to the Web application registered by the registration unit.

According to still another aspect of the invention, an image forming system includes: the image forming apparatus described above; and a server for providing a Web application, wherein the Web application can be utilized through the image forming system that accesses the server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flowchart illustrating an operation of the image forming apparatus while a Web application is utilized.

FIG. 10 is a first table illustrating an example of a cache database managed by the image forming apparatus.

FIG. 11 is a sequence diagram illustrating the operation of the image forming apparatus when registration of the Web application is cancelled.

FIG. 15 is a first table illustrating an example of a cache database managed by an image forming apparatus according to a second embodiment.

FIG. 18 is a second table illustrating an example of a cache database managed by the image forming apparatus of the second embodiment.

DESCRIPTION OF THE PREFERRED EMBODIMENTS

Hereinafter, an image forming system according to an exemplary embodiment of the invention will be described with reference to the drawings.

[Outline]

The image forming system includes a server apparatus that acts as a Web server and an image forming apparatus. The server and each of the image forming apparatuses are connected through a network while being able to conduct communication with each other. A PC (Personal computer) that used by a user and a management apparatus that provides directory service are also connected to the network.

The image forming apparatus is a multi-function peripheral (MFP) provided with the scanner function, copying function, function as a printer, facsimile transmitting/receiving function, data communicating function, and server function. With the scanner function, the image forming apparatus reads an image from a document which has been set, and stores the read image in a hard disk drive (HDD) or the like. With the copying function, the device further prints the image on a sheet of paper or the like. With the function as a printer, on receipt of a print instruction from an external terminal such as a personal computer (PC), the device prints an image on a sheet of paper on the basis of the instruction. With the facsimile transmitting/receiving function, the device receives facsimile data from an external facsimile machine or the like and stores the data in a HDD or the like. With the data communicating function, the device transmits data to or receives data from an external device connected thereto. With the server function, the device allows a plurality of users to share, e.g., data stored in a HDD or the like.

The image forming apparatus has a Web browser function of accessing the server to display a Web page provided from the server. In the exemplary embodiment, the server apparatus is configured to be able to provide a Web application. Using the Web browser function, the image forming apparatus accesses the server to acquire information on a Web application, and display the Web page. Therefore, the image forming apparatus enables the Web application to be utilized.

In the image forming system, the Web application that is utilized in the image forming apparatus is registered in the image forming apparatus. Cache information on the Web application is stored in the image forming apparatus when the Web application is utilized. In the exemplary embodiment, the cache information is deleted from the image forming apparatus when the cache information does not need to be stored, for example, when the registration of the Web application is cancelled.

First Embodiment

Figure 1:
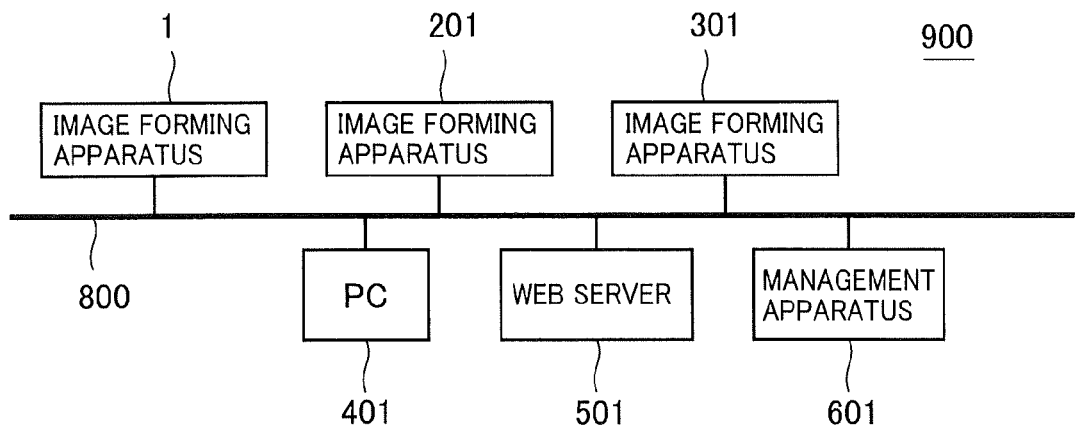
FIG. 1 is a block diagram illustrating a configuration of an image forming system according to a first embodiment of the invention.

FIG. 1 is a block diagram illustrating a configuration of an image forming system according to a first embodiment of the invention.

Referring to FIG. 1, an image forming system 900 includes three image forming apparatuses 1, 201, and 301, a client PC (hereinafter sometimes referred to as a PC) 401, a Web server (an example of the server) 501, and a management apparatus 601.

Image forming apparatuses 1, 201, and 301, Web server 501, PC 401, and management apparatus 601 are connected to a network 800. For example, network 800 is a LAN (Local Area Network). Image forming apparatuses 1, 201, and 301, Web server 501, PC 401, and management apparatus 601 can conduct communication with one another. Each apparatus may be connected to network 800 through a LAN cable or what is called a wireless LAN.

Image forming apparatuses 201 and 301 have the same configuration as image forming apparatus 1. Image forming apparatuses 201 and 301 may have the configuration different from that of image forming apparatus 1.

[Configuration of Image Forming Apparatus 1]

Figure 2:
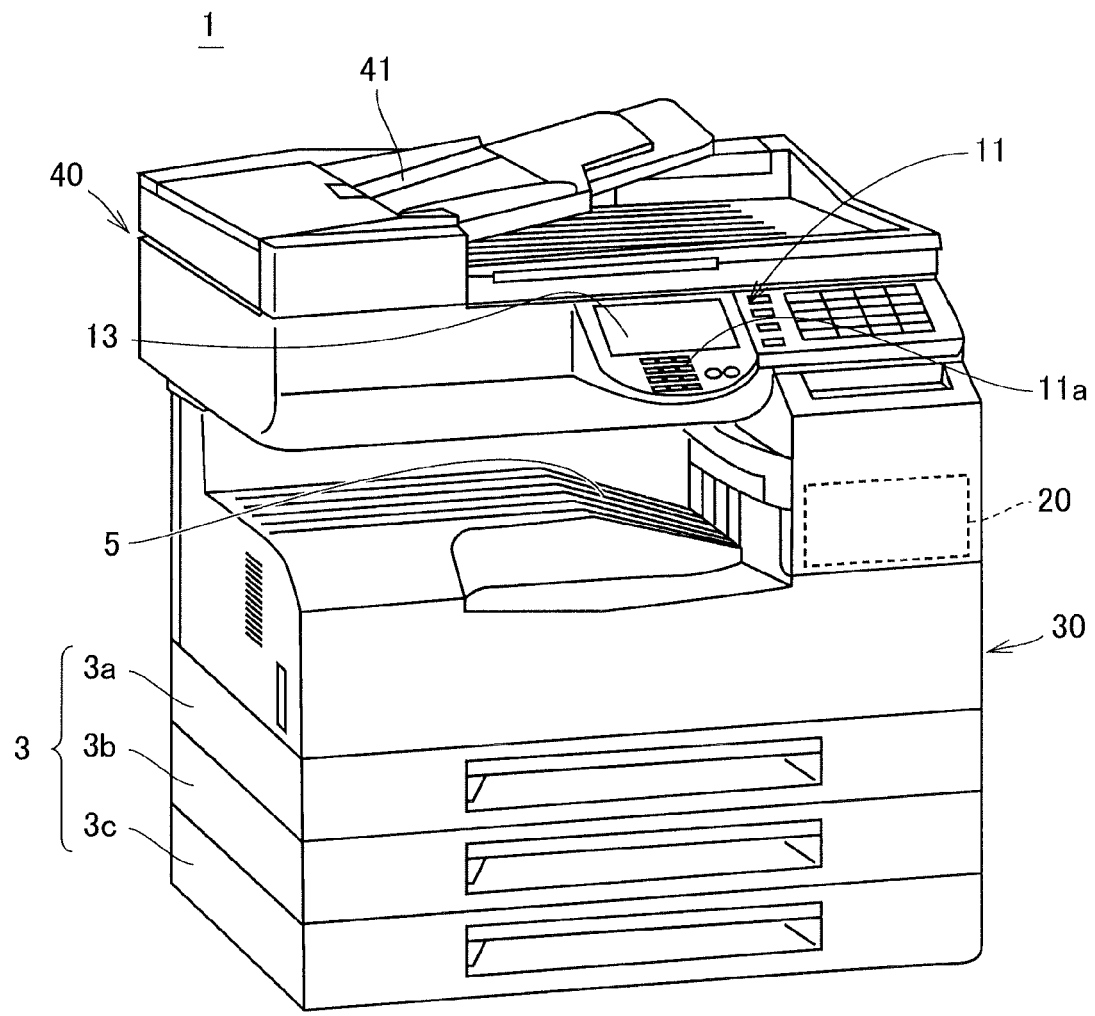
FIG. 2 is a perspective view illustrating an image forming apparatus.

FIG. 2 is a perspective view illustrating image forming apparatus 1.

Referring to FIG. 2, image forming apparatus 1 includes a sheet feed cassette 3, a sheet discharge tray 5, a manipulation unit 11, a controller 20, a printer 30, and a scanner 40. Controller 20 includes a CPU 21 (see FIG. 3) and controls an operation of image forming apparatus 1. Controller 20 and printer 30 are disposed in a chassis of image forming apparatus 1.

Image forming apparatus 1 includes three sheet-feed cassettes 3 (sheet-feed cassettes 3*a*, 3*b*, and 3*c*). For example, sheets having different sizes (such as a B5 size, an A4 size and an A3 size) are loaded on sheet-feed cassettes 3. Sheet-feed cassettes 3 are disposed in a lower portion of image forming apparatus 1 while being able to be inserted in and taken out from the chassis of image forming apparatus 1. During the print, the sheets loaded in each sheet-feed cassette 3 are fed one by one and delivered to printer 30. The number of sheet-feed cassettes 3 is not limited to three, but the number of sheet-feed cassettes 3 may be larger or smaller than three.

In the chassis of image forming apparatus 1, sheet discharge tray 5 is disposed above a region in which printer 30 is accommodated and below a region in which scanner 40 is disposed. The sheet in which the image is formed by printer 30 is discharged to sheet discharge tray 5 from an inside of the chassis.

Manipulation unit 11 is disposed on a front (front surface in FIG. 2) side in an upper portion of image forming apparatus 1. A plurality of manipulation buttons 11*a* that can be pressed by a user are disposed in manipulation unit 11. A display panel 13 that displays information to the user is disposed in manipulation unit 11. For example, display panel 13 is an LCD (Liquid Crystal Display) provided with a touch panel. Display panel 13 displays a guide screen to the user and a manipulation button, and receives a touch manipulation from the user. Display panel 13 performs the display under the control of CPU 21. Manipulation unit 11 receives a manipulation input from the user. When the user manipulates manipulation button 11*a* or display panel 13, manipulation unit 11 transmits a manipulation signal or a predetermined command corresponding to the manipulation to CPU 21. That is, the user can cause image forming apparatus 1 to perform various operations by manipulating manipulation unit 11.

Printer 30 generally includes a toner image forming unit (not illustrated), a sheet conveying unit (not illustrated), and a fixing device (fixing device). Printer 30 forms the image in the sheet by an electrophotographic method in which a toner image formed by the toner image forming unit is transferred to the sheet.

The sheet conveying unit is constructed by a sheet feed roller, a conveying roller, and a motor that drives the sheet feed roller and the conveying roller. In the sheet conveying unit, the sheet is fed from sheet-feed cassette 3 and conveyed in the chassis of image forming apparatus 1. The sheet conveying unit discharges the sheet in which the image is formed to sheet discharge tray 5 from the chassis of image forming apparatus 1.

The toner image forming unit includes a photosensitive body, a development device, an exposure device, and a transfer roller. The toner image forming unit forms the toner image that is formed in the sheet, and transfers the toner image to the sheet conveyed by the sheet conveying unit.

The fixing device includes a heating roller and a pressurizing roller. The fixing device conveys the sheet in which the image is formed while the sheet is nipped between the heating roller and the pressurizing roller, and heats and pressurizes the sheet. Therefore, the fixing device melts toner adhering to the sheet, and fixes the toner to the sheet to form the image in the sheet.

Scanner 40 is disposed in the upper portion of the chassis of image forming apparatus 1. Scanner 40 includes an ADF (Auto Document Feeder) 41. Scanner 40 performs the scanner function. In scanner 40, a manuscript disposed on a transparent manuscript stage is scanned with a contact image sensor and read as image data. In scanner 40, the pieces of image data of the plurality of manuscripts are read while the manuscripts set in a manuscript tray are sequentially taken in by the ADF 41.

Figure 3:
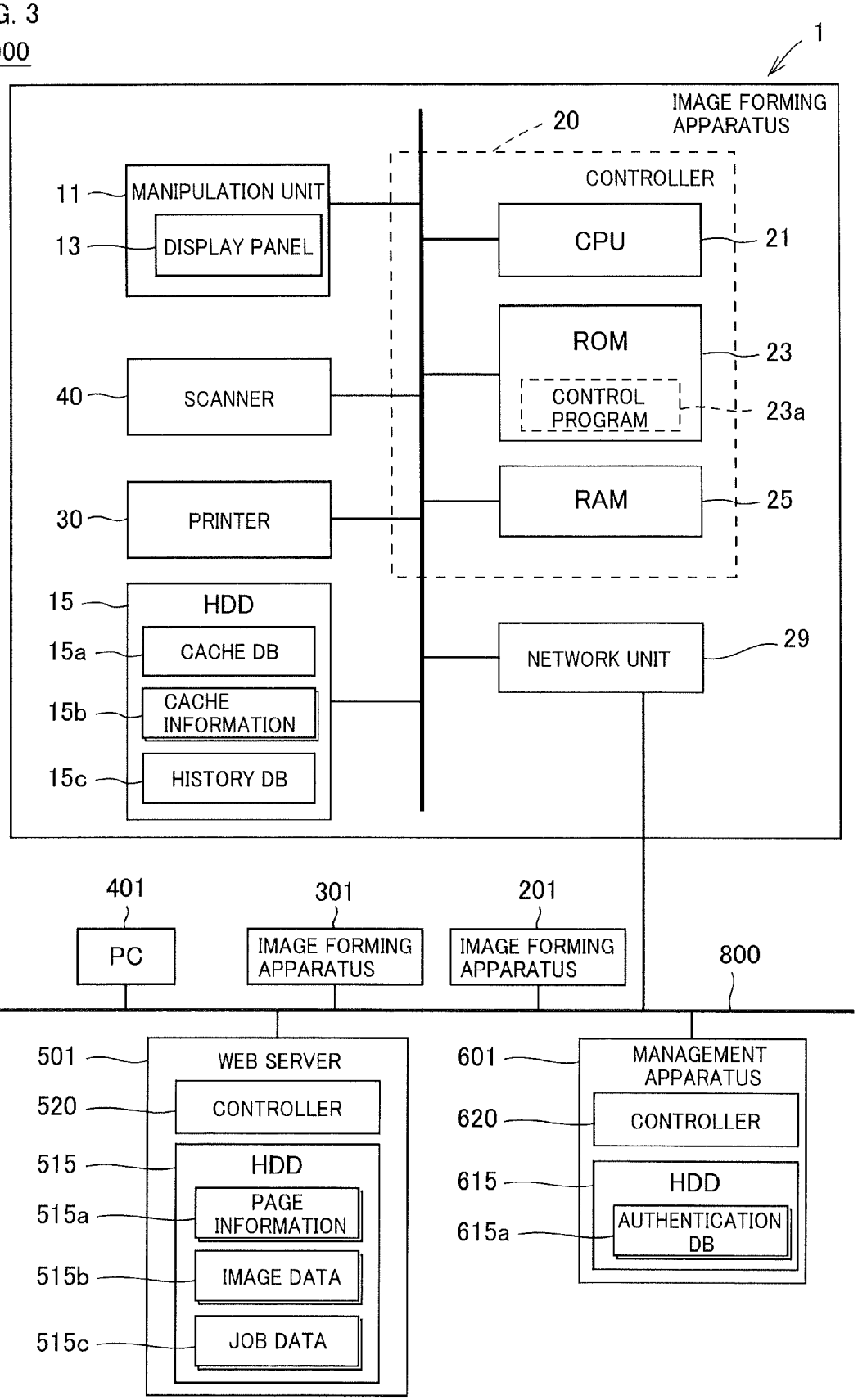
FIG. 3 is a block diagram illustrating a hardware configuration of each piece of apparatus of the image forming system.

FIG. 3 is a block diagram illustrating a hardware configuration of each piece of apparatus of image forming system 900.

Referring to FIG. 3, image forming apparatus 1 includes an HDD 15 and a network unit 29 in addition to the above units. Each unit of image forming apparatus 1 is connected to a system bus. Controller 20 can conduct communication with each unit of image forming apparatus 1.

Data of a print job transmitted from an outside through network unit 29 and the image data read by scanner 40 are stored in HDD 15. Setting information on image forming apparatus 1 and a control program for performing various operations of image forming apparatus 1 are stored in HDD 15. A plurality of print jobs transmitted from one PC 401 or a plurality of PCs can be stored in HDD 15.

For example, a cache database (DB) 15*a*, cache information 15*b*, and a history database 15*c* are stored in HDD 15. These pieces of information are generated and stored based on a Web browser function.

For example, network unit 29 is constructed by a combination of a hardware unit such as an NIC (Network Interface Card) and a software unit that conducts communication by a predetermined communication protocol. Network unit 29 connects image forming apparatus 1 to network 800. Therefore, image forming apparatus 1 can conduct communication with external devices, such as PC 401 and Web server 501, which are connected to network 800. Image forming apparatus 1 can receive the print job from PC 401 and Web server 501. Image forming apparatus 1 can transmit the image data read by scanner 40 to PC 401, or transmit the image data by an e-mail through a mail server (not illustrated). Network unit 29 may be configured to be able to be connected to network 800 through wireless communication.

Controller 20 includes the CPU 21, a ROM 23, and a RAM 25. Controller 20 is connected to the system bus in conjunction with manipulation unit 11, printer 30, and scanner 40. Therefore, controller 20 and each unit of image forming apparatus 1 are connected to each other so as to be able to transmit and receive the signal.

CPU 21 executes a control program 23a stored in ROM 23 and a control program (not illustrated) stored in RAM 25 or HDD 15. Therefore, CPU 21 controls various operations of image forming apparatus 1. CPU 21 executes control program 23a when the manipulation signal is transmitted from manipulation unit 11 or when the manipulation command is transmitted from PC 401. Therefore, a predetermined function of image forming apparatus 1 is performed according to manipulation unit 11 manipulated by the user.

For example, ROM 23 is a flash ROM (flash memory). The data used to perform the operation of image forming apparatus 1 is stored in ROM 23. Various control programs 23a are stored in RUM 23. Function setting data of image forming apparatus 1 may be stored in ROM 23. CPU 21 reads the data from ROM 23 and writes the data in ROM 23. ROM 23 may be not rewritable.

RAM 25 is a main memory of CPU 21. RAM 25 is used to store necessary data when CPU 21 executes control program 23a.

As described above, scanner 40 performs the scanner function to read the image data from the manuscript. The image data read by the scanner 40 is converted into an application data format by CPU 21, and stored in HDD 15. CPU 21 can transmit the image data stored in HDD 15 to PC 401.

[Configuration of Web Server 501]

Referring to FIG. 3, Web server 501 includes a controller 520 and an HDD 515. Controller 520 includes a CPU (not illustrated), a ROM (not illustrated), and a RAM (not illustrated), and controls Web server 501.

A control program (not illustrated) of Web server 501 and various pieces of information are stored in HDD 515. Controller 520 controls Web server 501 based on the control program, thereby performing the Web server function and other functions of Web server 501. Web server 501 can perform the function as the Web server function and a function as a file server. Web server 501 can perform a function as a transmission server of an electronic mail and a function of transmitting the image through the facsimile.

In the first embodiment, page information 515a, image data 515b, and job data 515c are stored in HDD 515. For example, page information 515a is document data described in a markup language such as an HTML (Hyper Text Markup Language). For example, image data 515b is used in the Web page that is displayed based on the page information. For example, job data 515c is data of the print job that can be performed by image forming apparatuses 1, 201, and 301.

[Description of Management Apparatus 601]

Management apparatus 601 is a server that provides directory service such as a LDAP (Lightweight Directory Access Protocol) and an Active Directory (registered trademark). Management apparatus 601 includes a controller 620 and an HDD 615. Controller 620 includes a CPU (not illustrated), a ROM (not illustrated), and a RAM (not illustrated), and controls management apparatus 601.

A control program (not illustrated) of management apparatus 601 and information for providing the directory service are stored in HDD 615. An authentication database 615a is stored in HDD 615. Authentication information for authenticating a user who uses image forming system 900 is managed in authentication database 615a.

[Description of User Authentication]

In the first embodiment, the user can login to image forming apparatus 1 to be able to utilize image forming system 900 using a user authentication function performed through image forming apparatus 1.

The user authentication function is implemented as follows. That is, information on the user to whom the user authentication can be performed and authentication information necessary to authenticate the user are recorded in authentication database 615a while being correlated with each other. For example, the authentication information is a password that is set in each user. Information on the function that can be performed with respect to each user is recorded in authentication database 615a while being correlated with the user.

In the user authentication function, a user authentication screen 61 (see FIG. 4) is presented to the user. User authentication screen 61 is displayed on display panel 13. The user manipulates manipulation unit 11 to input user information (such as an account name) and the password to image forming apparatus 1. When these pieces of information are input to manipulation unit 11, CPU 21 transmits the input pieces of data to management apparatus 601. In management apparatus 601, controller 620 refers to authentication database 615a to determine whether the user is authenticated based on the received pieces of data. When the user is authenticated, management apparatus 601 determines that the user is authenticated, and transmits an authentication result to image forming apparatus 1. Image forming apparatus 1 receives the authentication result to enable the function, which can be performed with respect to the authenticated user, to be performed. At this point, the authenticated user logs in to image forming apparatus 1. Therefore, image forming apparatus 1 can identify the user who uses image forming apparatus 1. Using the user authentication function, the display of display panel 13 and the utilizable function are adapted to the authenticated user to enhance the convenience of image forming apparatus 1. A high security effect is obtained by the use of the user authentication function such that, when the authenticated user exists near image forming apparatus 1, a printed matter is output while being kept away from other users.

Figure 4:
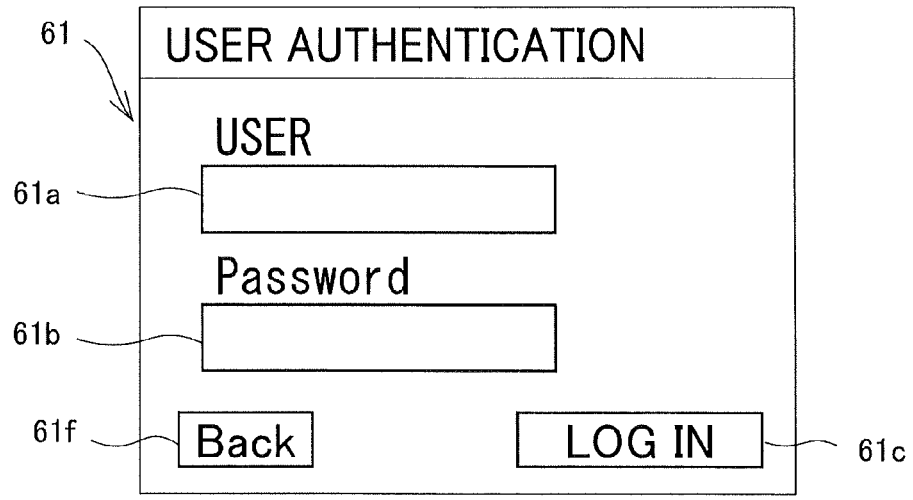
FIG. 4 is a view illustrating an example of a user authentication screen.

FIG. 4 is a view illustrating an example of user authentication screen 61.

Referring to FIG. 4, input areas 61a and 61b, a login button 61c, and a back button 61f are disposed in user authentication screen 61. The account name of the user is input to input area 61a. The password of the user is input to input area 61b. Login button 61c is used to perform the user authentication based on the pieces of data input to input areas 61a and 61b. Back button 61f is used to cause the screen to transition to a usual menu screen of image forming apparatus 1 from user authentication screen 61.

The user properly inputs the account name and the password to input areas 61a and 61b through manipulation unit 11. When the user presses login button 61c, the input pieces of data are transmitted to management apparatus 601. Therefore, the user can perform the user authentication.

Image forming apparatus 1 can authenticate the user who uses image forming apparatus 1 through the user authentication. In image forming apparatus 1, CPU 21 performs management relating to use authority of the user with respect to the function of image forming apparatus 1 according to the identified user. The use of a predetermined function can be restricted in each user by performing the authority management, and the high security effect is obtained.

The user authentication method is not limited to the above method, but a well-known method can properly be adopted. The reference database of the authentication information or the subject that performs the authentication may be different from those of the first embodiment. For example, image forming apparatus 1 may possess the authentication information for performing the user authentication. In this case, image forming apparatus 1 can receive an authentication request from the user, and authenticate the user based on the authentication information. For example, a card authentication method in which a contact or non-contact ID card is used or a biometric authentication method in which fingerprint information or venous information on the user is utilized may be adopted, and the user does not need to input the information on the account name or the password.

The user logs in to image forming system 900 through image forming apparatus 1, and each of the image forming apparatuses 1, 201, and 301 may identify the user who logs in to image forming system 900. The authority management may be performed by the whole of image forming system 900. At this point, for example, management apparatus 601 may provide information on the use authority of the user, such as the function that can be used in image forming system 900 and an accessible point, to each apparatus.

[Description of Pull-Print Function]

In image forming system 900, image forming apparatus 1 can perform print by pull print based on job data 515*c* stored in Web server 501 (pull-print function).

Figure 5:
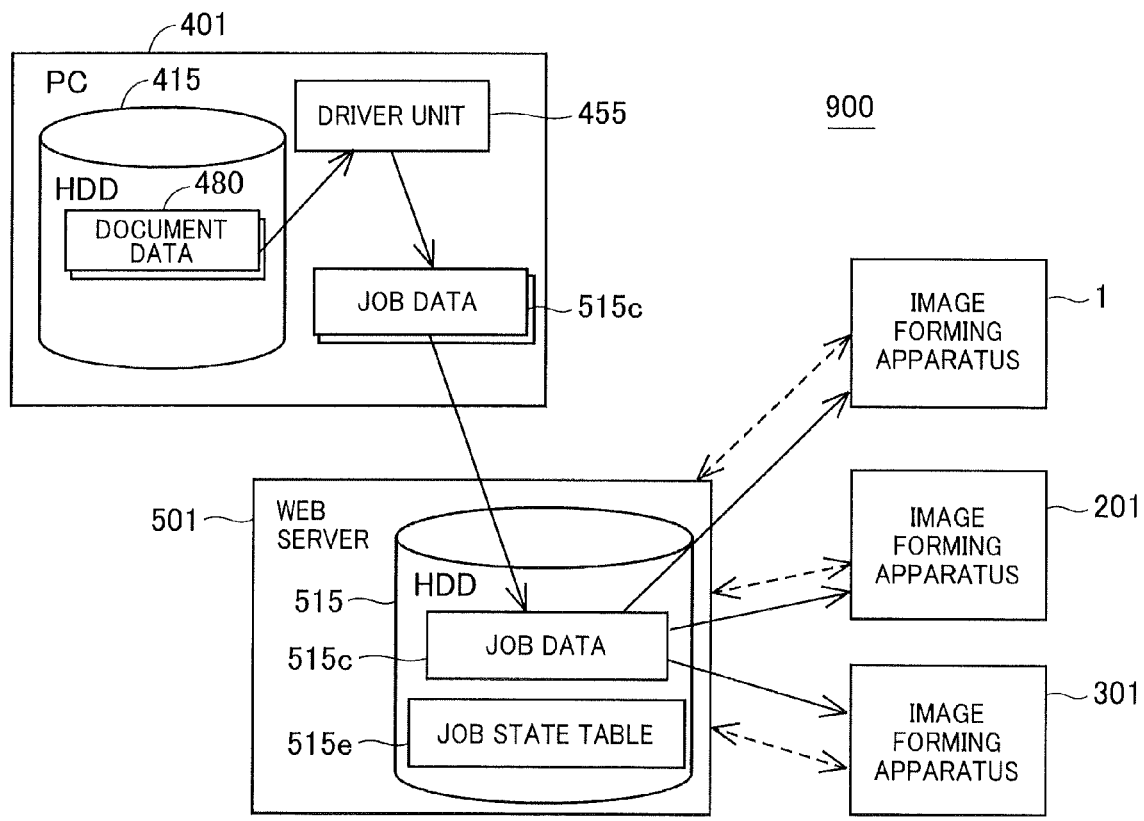
FIG. 5 is a block diagram illustrating an example of a pull-print function in the image forming system.

FIG. 5 is a block diagram illustrating an example of the pull-print function in image forming system 900.

Referring to FIG. 5, the pull print will be described in detail. The user transmits Web server 515*c* to Web server 501 from PC 401 before performing the pull print. For example, job data 515*c* is described in a PDL (Page Description Language) that can be dealt with by image forming apparatus 1. Image forming apparatus 1 interprets job data 515*c* as information on the print job. In image forming apparatus 1, a raster image is generated according to job data 515*c* by a RIP (Raster Image Processor) constructed by controller 20, and the print can be performed.

For example, job data 515*c* is generated and stored in Web server 501 as follows. PC 401 includes an HDD 415 and a driver unit 455 that is constructed such that a CPU (not illustrated) executes a control program. For example, the user operates an application program on PC 401, and inputs an instruction to transmit document data 480 stored in HDD 415 to Web server 501 to PC 401. In response to the instruction from the user, driver unit 455 converts document data 480 into job data 515*c*, and transmits job data 515*c* as the print job to Web server 501. That is, in performing the pull print, generated job data 515*c* is not directly transmitted to image forming apparatus 1, but tentatively spooled in Web server 501. Controller 520 of Web server 501 stores transmitted job data 515*c* in HDD 515. For example, a plurality of data storage partitions called BOX are provided in HDD 515. Job data 515*c* is stored in one of the BOXES. An access authority is set to each BOX in order to restrict the user who can access to the BOX. For example, when a specific user logs in to image forming apparatus 1, the access authority with respect to a certain BOX is set such that the user can access to the BOX from image forming apparatus 1 or store the data in the BOX.

When job data 515*c* is transmitted, Web server 501 updates a job state table 515*e* with respect to transmitted job data 515*c*. For example, job state table 515*e* includes information on a state in which each piece of job data 515*c* is performed.

When image forming apparatus 1 receives the instruction to perform the pull print while job data 515*c* is stored in HDD 515 of Web server 501, image forming apparatus 1 conducts communication with Web server 501 to acquire job data 515*c*. When acquiring job data 515*c*, image forming apparatus 1 performs the print job to output the printed matter. The instruction to perform the pull print may be received such that controller 20 of image forming apparatus 1 executes control program 23*a* for performing the pull print. The instruction to perform the pull print may be received by performing the Web application as described later.

For example, the pull print is performed while the user logs in to image forming apparatus 1 that is of an output destination of the pull print. In image forming apparatus 1 to which the user logs in, when the user performs the manipulation to perform the pull print, the printed matter is output while the user exists by the side of image forming apparatus 1. The pull print is performed in the above manner to obtain the high security effect. In the first embodiment, image forming apparatuses 201 and 301 have the same configuration and function as image forming apparatus 1, and image forming apparatuses 201 and 301 can perform the pull print. The user may select image forming apparatuses 1, 201, and 301 that perform the print when logging in to image forming apparatus 1. For example, the user may assign one of image forming apparatuses 1, 201, and 301 as a print destination when logging in to image forming apparatus 1.

[Description of Web Browser Function]

In the Web browser function of image forming apparatus 1, the Web page provided by Web server 501 is displayed on display panel 13 in a browsable manner by the Web browser (an example of the acquisition unit). The Web browser accesses Web server 501 to acquire information on the Web page provided by Web server 501.

Figure 6:
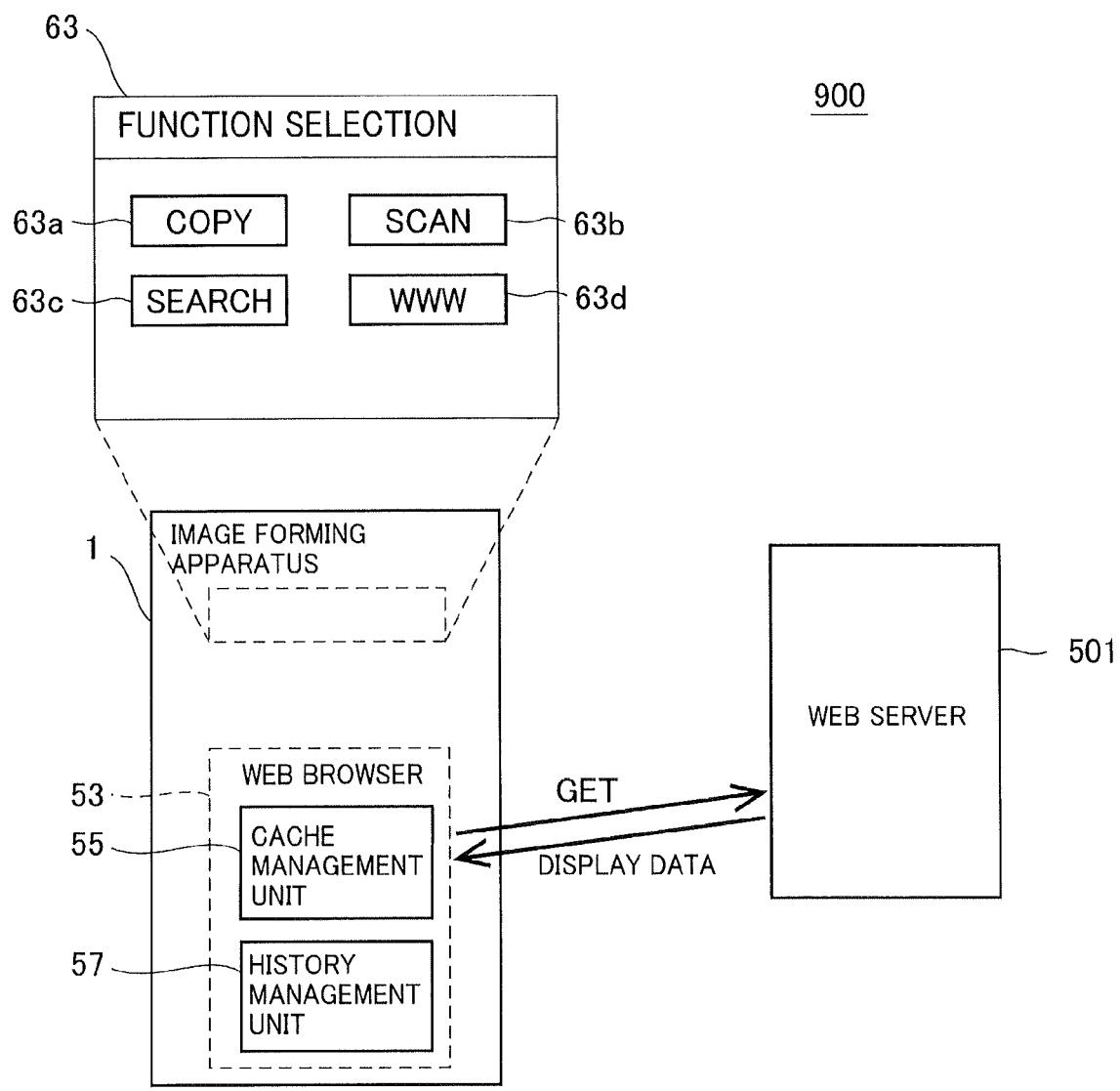
FIG. 6 is a view illustrating a Web browser function.

FIG. 6 is a view illustrating the Web browser function.

Referring to FIG. 6, in image forming apparatus 1, a Web browser 53 is activated and operated such that CPU 21 activates predetermined control program 23*a*. For example, Web browser 53 is activated when the user issues a predetermined manipulation instruction through manipulation unit 11 while a function selection screen 63 is displayed on display panel 13.

Function selection screen 63 is displayed on display panel 13 under the control of CPU 21. For example, buttons 63*a*, 63*b*, 63*c*, and 63*d* that are used to select various utilizable functions in image forming apparatus 1 are disposed in function selection screen 63. The functions corresponding to assigned buttons 63*a*, 63*b*, 63*c*, and 63*d* can be utilized by performing the manipulation to assign buttons 63*a*, 63*b*, 63*c*, and 63*d* through display panel 13 and the button of manipulation unit 11. Copy button 63*a* corresponds to a copying function. Scan button 63*h* corresponds to a scanner function. Search button 63*c* corresponds to a search function. Web button 63*d* corresponds to a Web browsing function. The search function is a function of connecting image forming apparatus 1 to a predetermined search engine to perform search work. The Web browsing function is a function in which the Web page provided by the desired Web server is displayed in the browsable manner or a function of printing the Web page. The search function and the Web browsing function can be used by utilizing the Web browser function. That is, when the manipulation to assign search button 63*c* or Web button 63*d* is performed, Web browser 53 is activated in image forming apparatus 1.

Web browser 53 generates the display image of the Web page and displays the generated display image of the Web page on display panel 13 based on information (for example, the data described in the HTML and the image data included in the Web page) for displaying the Web page.

In the Web browser function, image forming apparatus 1 can browse the Web page provided by the Web server that can conduct communication through network 800 including Web server 501. For example, Web browser 53 makes a request to acquire the information (display data) for displaying the Web page based on a URI (Uniform Resource Identifier) assigned by the user by a predetermined communication protocol (such as the HTTP) (GET). The Web server that receives the request transmits the display data to Web browser 53. Therefore, Web browser 53 can acquire the display data. For example, the display data is page information 515a and image data 515b corresponding to page information 515a.

For example, the URI is assigned such that the user directly performs the input manipulation through manipulation unit 11. For example, the URI is assigned by performing the manipulation to assign a hyperlink that is included in the Web page displayed in the browsable manner and indicates another Web page.

A cache management unit (an example of the storage, an example of the cache management unit, and an example of the deletion unit) 55 and a history management unit 57 function when Web browser 53 functions. Cache management unit 55 and history management unit 57 is implemented as one of the functions of Web browser 53. That is, cache management unit 55 and history management unit 57 are implemented such that CPU 21 executes control program 23a.

Cache management unit 55 stores the information acquired by Web browser 53 as cache information 15b in HDD 15. Cache information 15b includes page information described in the markup language and the image data included in the Web page that is browsed based on the page information. Cache information 15b may include the information and program used to display the Web page in addition to the page information and the image data. Cache management unit 55 manages each piece of cache information 15b using cache database 15a. In cache database 15a, for example, pieces of information such as the URI, a file name, and an acquisition time are stored with respect to the cache information.

History management unit 57 manages information on a history in which Web browser 53 acquires the information as the history information using history database 15c. For example, the history information includes the URI and acquisition time of the acquired information.

For example, cache management unit 55 deletes assigned cache information 15b and the information on cache information 15b stored in the cache database 15a in response to the manipulation instruction of the user. For example, history management unit 57 deletes the assigned record in the records of history database 15c in response to the manipulation instruction of the user.

Cache management unit 55 may delete one of or both cache information 15b and the information on cache information 15b stored in the cache database 15a in predetermined timing. Examples of the predetermined timing include the time a predetermined time elapses since cache information 15b is stored and the time a predetermined time elapses since the final access to the Web page. Similarly history management unit 57 may delete the record of history database 15c in predetermined timing. Examples of the predetermined timing include the time a predetermined time elapses since the history information is stored and the time a predetermined time elapses since the final access to the Web page.

According to the Web browser function, the user activates Web browser 53 to display the desired Web page on display panel 13, which allows the user to browse the Web page. The user can browse the Web page of the link destination of the hyperlink by assigning the hyperlink included in the browsing Web page. When the Web page is displayed by Web browser 53, the user can perform the predetermined manipulation instruction to Web browser 53. Therefore, the user can cause image forming apparatus 1 to form the image with respect to the currently-displayed Web page.

[Description of Web Application]

Web server 501 is configured to be able to provide the Web application. That is, Web server 501 acts as an application server (a Web application server). Web browser 53 accesses Web server 501 to acquire the information on the Web application, and displays the Web page. Therefore, Web browser 53 can present the Web application to the user such that the user can utilize the Web application. The following points can be cited as advantages of the Web application method. It is not necessary to individually set the application software in image forming apparatus 1 in the utilizable manner. Only when the program on the side of Web server 501 is changed, the Web application after the change can be utilized by the whole of image forming system 900. Accordingly, in image forming system 900, the convenience is enhanced and maintenance is easy to perform.

In the first embodiment, one or a plurality of Web applications can be registered in image forming apparatus 1. The registration of the Web application means that the Web application is set in image forming apparatus 1 so as to be able to be quickly activated. In the first embodiment, for example, information (such as the URI) for acquiring information (for example, information on the Web page displayed in activating the Web application) for performing the Web application is registered. When the Web application is registered, a shortcut icon that activates the Web application is displayed on the predetermined function selection screen such that the user can easily select the shortcut icon. At this point, information necessary to register the Web application and information necessary to use the registered Web application are transmitted from Web server 501 to image forming apparatus 1. The transmitted pieces of information are stored in image forming apparatus 1. Web browser 53 acquires the information for performing the Web application based on the information, such as the URI, which is registered in an application management unit 51 to acquire the information on the Web page. The user can easily utilize the Web application by the registration of the Web application.

The Web application may be registered in the following mode. For example, the Web application may be registered by recording what is called a bookmark (the URL of the Web page is recorded in Web browser 53 so as to be able to be selected again) including the information, such as the URI, which activates the Web application. For example, even if the shortcut icon is not displayed, the bookmark is set in image forming apparatus 1 such that the Web application is activated according to the predetermined manipulation input performed by the user or a predetermined behavior (such as the authentication operation), which can be detected by image forming apparatus 1, performed by the user.

A specific example of the Web application function utilized in image forming system 900 will be described below. In image forming system 900, for example, the pull-print function and the scan transmission function are implemented by the Web application function. Hereinafter, sometimes the Web application that implements the pull-print function is referred to as "APP1". Sometimes the Web application that implements the scan transmission function is referred to as "APP2". In the first embodiment, APP1 and APP2 can be utilized while being registered in image forming apparatus 1.

Figure 7:
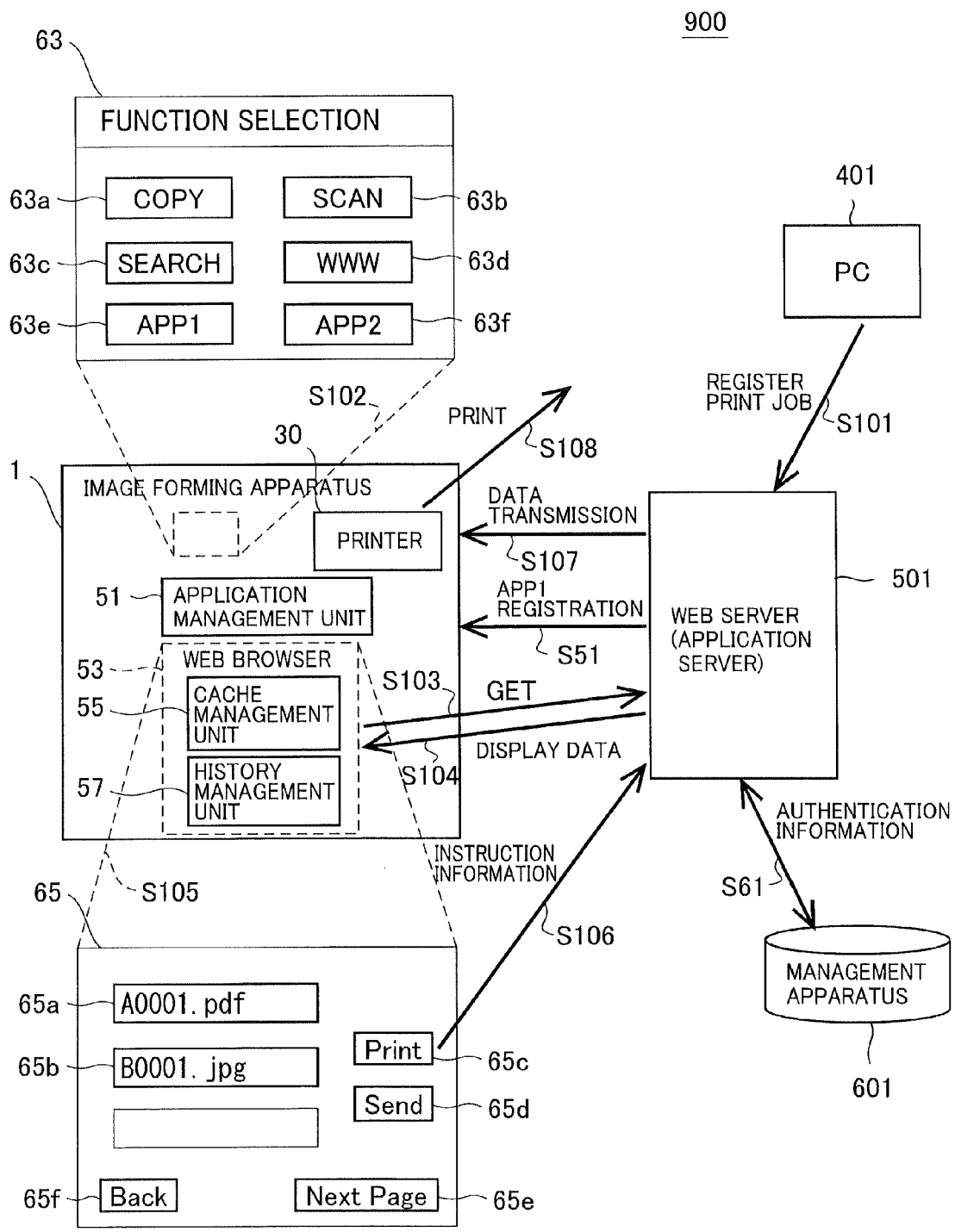
FIG. 7 is a view illustrating an example of the pull-print function implemented by a Web application function.

FIG. 7 is a view illustrating an example of the pull-print function implemented by the Web application function.

A flow of the registration of the Web application will be described before the description of the pull-print function. Referring to FIG. 7, application management unit (an example of the registration unit, and example of the registration cancelling unit) 51 is provided in image forming apparatus 1. Application management unit 51 is implemented such that CPU 21 executes control program 23a.

Application management unit 51 registers the Web application provided by Web server 501. For example, when the predetermined manipulation input is performed in image forming apparatus 1, application management unit 51 registers the Web application in image forming apparatus 1. In image forming apparatus 1, when the Web application provided by Web server 501 is assigned as the Web application that becomes a registration target, application management unit 51 acquires the information on the Web application assigned from Web server 501 (S51). Application management unit 51 acquires the information, such as the URI and identification information (such as a cookie) of the Web application, which is necessary to use the Web application. At this point, application management unit 51 stores the information on the Web page, in which the Web application is displayed, in cache management unit 55. Application management unit 51 registers the Web application based on the acquired information.

For example, the registration of the Web application is performed by recording the URI of the application to be registered in a database that manages the Web application. In the first embodiment, when the Web application is registered, buttons corresponding to the Web applications are displayed on function selection screen 63 in parallel to buttons 63a, 63b, 63c, and 63d corresponding to the various stand-alone applications of image forming apparatus 1. In the example of FIG. 7, APP1 and APP2 are registered as the Web application in image forming apparatus 1. A button 63e that is used to activate APP1 and a button 63f that is used to activate APP2 are displayed on function selection screen 63 in conjunction with buttons 63a, 63b, 63c, and 63d. The user can utilize APP1 in image forming apparatus 1 by performing the manipulation input of button 63e. The user can utilize APP2 in image forming apparatus 1 by performing the manipulation input of button 63f.

At this point, only the user who logs in to image forming apparatus 1 by the user authentication function may register the Web application. For example, the registration of the Web application can be restricted such that only the user who has manager authority of image forming apparatus 1 or the user who has manager authority of image forming system 900 resisters the Web application.

The registerable Web application may be restrictive. Application management unit 51 may be set such that only a predetermined Web application can be registered. In this case, when the Web application is assigned as the registration target, application management unit 51 may determine whether the Web application is registerable. For example, application management unit 51 previously has a table indicating the registerable Web application, and application management unit 51 may determine that the Web application is registerable based on the table. For example, approval information is provided to the Web application satisfying a given requirement, and only the Web application to which the approval information is provided may be registered. For example, application management unit 51 acquires the approval information on the Web application from Web server 501 prior to registering the Web application, and application management unit 51 may determine whether the Web application is registerable based on the approval information.

The Web application may be registered in image forming apparatus 1 based on an instruction from an external device that can conduct communication with Web server 501 or image forming apparatus 1. For example, Web server 501 transmits the information on the Web application to image forming apparatus 1 of the registration target, and application management unit 51 of image forming apparatus 1 may register the Web application when the information is received.

In the pull-print function, the print job is previously registered in Web server 501. In Step S101, PC 401 transmits the print job to Web server 501. When the print job is transmitted, job data 515c is stored in HDD 515 of Web server 501. The print job may be registered in a pull-print file server that is different from Web server 501.

In Step S102, when the Web application is utilized, manipulation unit 11 receives the instruction to select the Web applications registered by application management unit 51. Image forming apparatus 1 receives the instruction to perform the pull print from the user. That is, function selection screen 63 is displayed in display panel 13 of image forming apparatus 1. When the manipulation input of button 63e is performed on displayed function selection screen 63, APP1 corresponding to button 63e is activated. The Web page of APP1 is displayed by Web browser 53, and the user can browse the Web page and perform the manipulation input. Similarly, when the manipulation input of button 63f is performed on displayed function selection screen 63, APP2 corresponding to button 63f is activated. The Web page of APP2 is displayed by Web browser 53, and the user can browse the Web page and perform the manipulation input.

In Step S103, when the Web application is activated, Web browser 53 makes a request of the information on the Web page to Web server 501. At this point, cache information 15b is already stored with respect to the Web page on which the request of the information is made. When the Web page is not updated, Web browser 53 can acquire cache information 15b as contents of the Web page.

In Step S104, Web server 501 transmits the display data relating to the Web page at the request from Web browser 53. Therefore, Web browser 53 acquires the information for performing the Web application in response to the instruction to select the Web applications.

In Step S105, Web browser 53 performs the display on display panel 13 based on the received display data. Therefore, a print instruction screen 65 is displayed.

At this point, job selection buttons 65a and 65b, a print button 65c, a transmission button 65d, a transition-to-next-page button 65e, and a back button 65f are disposed on print instruction screen 65. Print instruction screen 65 has a screen configuration in which, at first glance, the user feels a stand-alone application manipulation screen. The user can select buttons 65a to 65f through manipulation unit 11.

The pieces of information on the print job stored in Web server 501 are displayed on job selection buttons 65a and 65b. The user can select the print job to be printed. Print button 65c is used to issue an instruction to perform the print job selected by one of buttons 65a and 65b. Transmission button 65d is used to issue an instruction to transmit the data of the print job selected by one of buttons 65a and 65b. For example, the data can be transmitted through the facsimile or the electronic mail. Transition-to-next-page button 65e is used to issue an instruction to display a page subsequent to the current page, for example, when the print jobs are displayed while being divided into a plurality of pages because of a large number of stored print jobs. Back button 65f is used to return to previously-displayed function selection screen 63 from print instruction screen 65.

In Step S106, when the user manipulates print button 65c, Web browser 53 transmits instruction information corresponding to the manipulation to Web server 501. The instruction information includes information specifying the print job of the print target and an instruction to print the print job. The instruction information may be information in a format for acquiring the URI or a format like another command.

In Step S107, when the instruction information is received, Web server 501 transmits the data of the specified print job to image forming apparatus 1.

In step S108, printer 30 of image forming apparatus 1 performs the print based on the data of the print job transmitted from Web server 501. That is, in image forming apparatus 1, the print job is performed in response to the instruction issued on print instruction screen 65.

Figure 8:
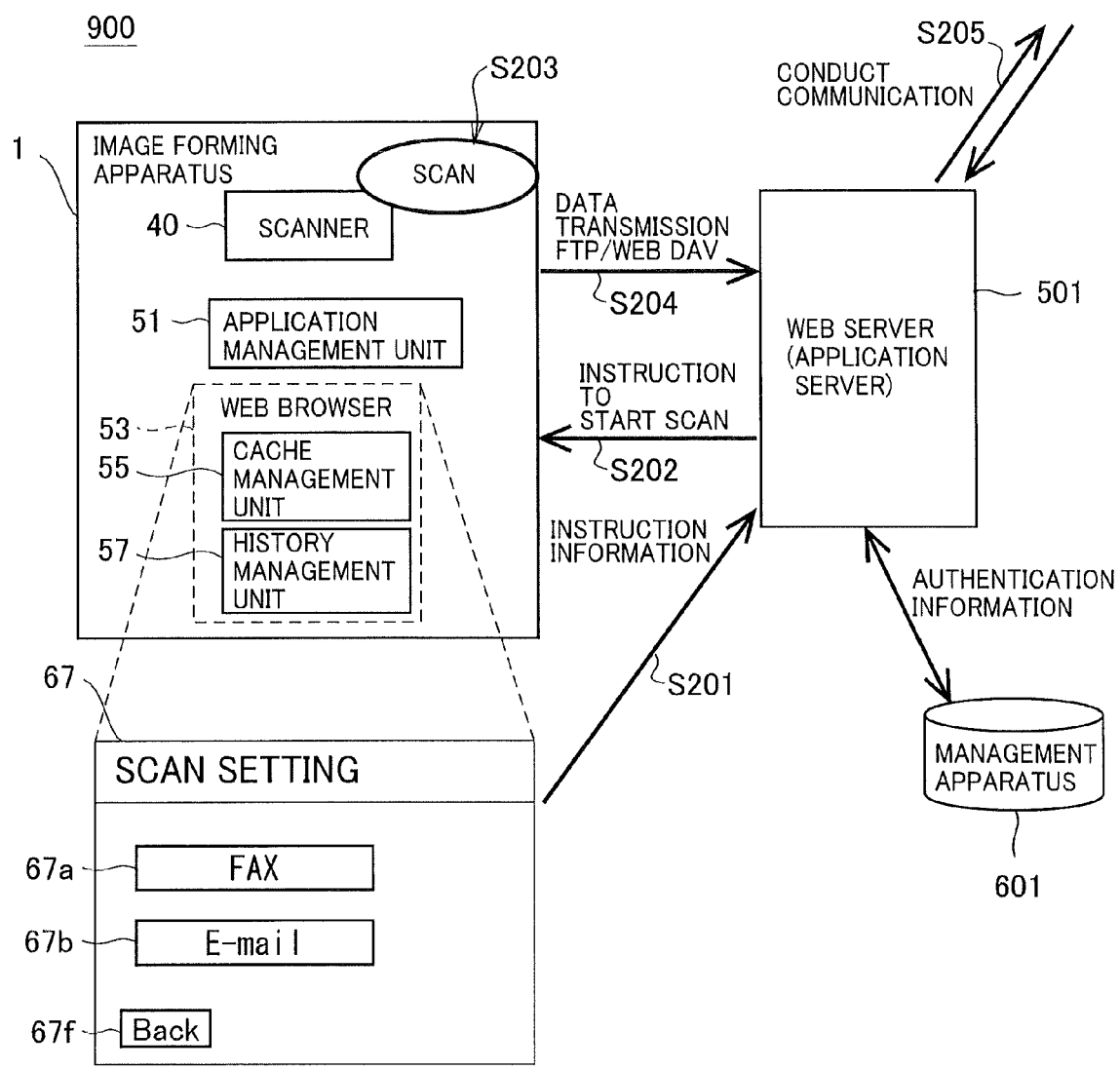
FIG. 8 is a view illustrating an example of a scan transmission function implemented by the Web application function.

FIG. 8 is a view illustrating an example of the scan transmission function implemented by the Web application function.

The scan transmission function is a function of transmitting the image data, which is generated by scanning the manuscript with scanner 40 of image forming apparatus 1, to the external device through Web server 501. Even if transmission destination information is not stored in image forming apparatus 1, the data can be transmitted based on the transmission destination information stored in Web server 501 or another apparatus in image forming system 900. For example, when the transmission destination information is stored in management apparatus 601 according to the user who logs in to image forming apparatus 1 or image forming system 900, the data may be transmitted to the transmission destination according to the login user.

For example, the scan transmission function is activated when button 63f corresponding to the scan transmission function is manipulated on the function selection screen 63. Web browser 53 accesses Web server 501 to acquire the information on the Web page. Based on the acquired information, Web browser 53 displays a setting screen of the scan transmission function such that the user can browse the scan transmission function setting screen. Therefore, the scan transmission function can be utilized.

Referring to FIG. 8, a setting screen 67 of the scan transmission function is displayed when the scan transmission function can be utilized. Setting screen 67 includes a facsimile transmission selection button 67a, an electronic mail transmission selection button 67b, and a back button 67f. Back button 67f is similar to back button 65f. Facsimile transmission selection button 67a is used to select facsimile transmission of the image that is generated by scanning the manuscript with scanner 40. When facsimile transmission selection button 67a is manipulated, the generated data is transmitted from Web server 501 by the facsimile transmission. Electronic mail transmission selection button 67b is used to select the transmission of the image, which is generated by scanning the manuscript with scanner 40, by the electronic mail. When electronic mail transmission selection button 67b is manipulated, the generated data is transmitted from Web server 501 by the electronic mail.

When facsimile transmission selection button 67a or electronic mail transmission selection button 67b is manipulated, setting screen 67 transitions to a transmission destination selection screen (not illustrated) for setting the transmission destination. For example, transmission destination candidates to which the image data can be transmitted by the scan transmission function is displayed on the transmission destination selection screen, and the user selects the actual transmission destination of the image data from the transmission destination candidates. The transmission destination candidates may be displayed based on the information stored in Web server 501 or the transmission destination information stored in management apparatus 601. The transmission destination candidates may be displayed based on the information stored in image forming apparatus 1.

In Step S201, when the manipulation to select the transmission method (for example, the facsimile transmission or the transmission by the electronic mail) is performed in setting screen 67, Web browser 53 transmits the instruction information to Web server 501. The instruction information may be information in the format for acquiring the URI or the format like another command.

In Step S202, Web server 501 transmits an instruction to start the scan to image forming apparatus 1 that transmits the instruction information.

In Step S203, image forming apparatus 1 scans the manuscript in response to the instruction to start the scan. Scanner 40 performs the scan. Therefore, the image data is generated.

In Step S204, image forming apparatus 1 transmits the generated image data to Web server 501. The transmission is performed by the protocol such as FTP (File Transfer Protocol) and WebDAV (Web Distributed Authoring and Versioning). The image data is stored in Web server 501.

In Step S205, based on the instruction information, Web server 501 transmits the image data to the assigned transmission destination by the method assigned on setting screen 67. For example, when the instruction to perform the facsimile transmission is issued, Web server 501 transmits the image data to an assigned telephone number as the transmission destination through a telephone line. When the instruction to perform the transmission by the electronic mail is issued, Web server 501 transmits the image data to an assigned mail address as the transmission destination by the electronic mail based on MIME (Multipurpose Internet Mail Extension). In performing the facsimile transmission, the image data may be transmitted through an IP (Internet Protocol) network such as Internet FAX.

In image forming apparatus 1, after image processing is performed to the image data generated by scanner 40, and the processed image data may be transmitted to Web server 501. After the image processing is performed to the transmitted image data, Web server 501 may transmit the image data. At this point, the image processing assigned on setting screen 67 may be performed. When the image processing is performed in image forming apparatus 1, information for specifying the image processing that should be performed to the image data may be transmitted from Web server 501 to image forming apparatus 1 once the instruction to start the scan is issued. In this case, for example, the information on the transmission method is transmitted to image forming apparatus 1, and image forming apparatus 1 may perform the image processing according to the transmission method.

The instruction information includes information for assigning the image forming apparatus that performs the scan, and Web server 501 may transmit the instruction to start the scan to the image forming apparatus that is assigned by the instruction information. In this case, the image forming apparatus to which the instruction to start the scan is transmitted may scan the manuscript and transmit the generated image data to Web server 501.

In the first embodiment, the image data is transmitted from Web server 501. Alternatively, the image data may be transmitted from another apparatus. For example, the image data may be transmitted from image forming apparatus 1. In this case, Web server 501 transmits an instruction to transmit the information on the selected transmission destination and the information on the selected transmission method to image forming apparatus 1, and image forming apparatus 1 may transmit the image data based on the instruction. Image forming apparatus 1 transmits the image data to another transmission server, the transmission server receives the instructions of the transmission method and transmission destination from Web server 501, and the transmission server may transmit the image data.

FIG. 9 is a flowchart illustrating an operation of image forming apparatus 1 while the Web application is utilized.

Referring to FIG. 9, in Step S301, CPU 21 starts the activation of the Web application (browser application). When the manipulation to select the registered Web application is performed while the Web application is displayed on function selection screen 63 displayed in display panel 13, the activation of the Web application is started. CPU 21 activates Web browser 53, and Web browser 53 activates the Web application.

In Step S303, CPU 21 checks whether cache database 15*a* exists.

When cache database 15*a* does not exist in Step S303, CPU 21 produces cache database 15*a* in Step S305.

When cache database 15*a* exists in Step S303, or when the processing in Step S305 is performed, CPU 21 acquires the information (contents such as the page information and the image data) for displaying the Web page in Steps S307 to S315.

In Step S307, CPU 21 checks the URL (Uniform Resource Locator, an example of the URI) that should be displayed by Web browser 53. The URL that should be displayed is URLs of the Web page, the image data, and the like which are displayed by the Web application in which the activation is started.

In Step S309, CPU 21 refers to cache database 15*a* to check whether cache information 15*b* on the Web page that should be acquired by Web browser 53 exists.

When cache information 15*b* exists in Step S309, CPU 21 checks whether cache information 15*b* supplied to Web server 501 is updated in Step S311.

When cache information 15*b* is not updated in Step S311, CPU 21 acquires the information for displaying the Web page from the cache in Step S313. That is, CPU 21 acquires cache information 15*b* as the information used to display the Web page.

On the other hand, when cache information 15*b* does not exist in Step S309, or when cache information 15*b* is updated in Step S311, CPU 21 acquires the information for displaying the Web page from Web server 501 in Step S315.

In Step S317, CPU 21 displays the Web page based on the acquired information. That is, CPU 21 displays contents.

In Step S319, CPU 21 retains the acquired information as cache information 15*b*. At this point, cache database 15*a* is updated.

In Step S321, CPU 21 performs unique processing of the activated Web application. For example, when the Web application that implements the pull-print function is activated, the print instruction is received from the user. For example, when the Web application that implements the scan transmission function is activated, the manipulation to set the transmission destination is received from the user.

In Step S323, CPU 21 determines whether an instruction (screen transition instruction) to make a request of the transition from the current Web page to another Web page is issued. That is, CPU 21 receives the screen transition instruction from the user while the Web page is displayed based on the Web application. For example, the screen transition instruction is received according to contents of the currently-displayed Web page or contents of the currently-activated Web application.

When the screen transition instruction is issued in Step S323, CPU 21 makes a request to display the Web page of a transition destination and performs the pieces of processing from Step S307 again in Step S325. The information for displaying the Web page of the screen transition destination is acquired and stored as cache information 15*b* by performing the pieces of processing from Step S307 again. In other words, Web browser 53 acquires the information on the Web page that is demanded to be acquired in performing the Web application. Cache management unit 55 stores the information on the Web page, which is acquired by Web browser 53, as cache information 15*b*. That is, in addition to the information for performing the Web application, which is acquired by Web browser 53 when the Web application is activated, the information on another Web page acquired by Web browser 53 is stored as cache information 15*b*.

When the screen transition instruction is not issued in Step S323, CPU 21 ends the Web application.

[Description of Cache]

In the first embodiment, cache management unit 55 manages information indicating a correspondence relationship between cache information 15*b* and the Web application in cache database 15*a*.

FIG. 10 is a first table illustrating an example of cache database 15*a* managed by image forming apparatus 1.

Referring to FIG. 10, pieces of information of the file name, the URL, Application number, and a validated date are recorded in cache database 15*a* with respect to each file of cache information 15*b* while being correlated with one another. The plurality of Web applications can be registered in image forming apparatus 1.

A unique application number is allocated to each Web application registered in image forming apparatus 1. In the files of cache information 15*b*, cache management unit 55 records the file relating to the Web application in cache database 15*a* in conjunction with the information on the file relating to the Web application and the application number. That is, in cache database 15*a*, the information indicating the correspondence relationship between cache information 15*b* and the Web application is managed as the record of each file of cache information 15*b*. The application number is similarly provided to the Web page, which is acquired in association with the screen transition when the Web application is operated. The URL of the Web page and the Web application are recorded while being correlated with each other.

As illustrated in FIG. 10, cache information 15*b* managed by cache database 15*a* includes cache information 15*b* on the Web application (hereinafter referred to as an application 1) having the application number of "1" and cache information 15*b* on the Web application (hereinafter referred to as an application 2) having the application number of "2". Cache information 15*b* includes cache information 15*b* in which a validated date is provided and cache information 15*b* in which the validated date is not provided.

In the pieces of cache information 15*b* relating to application 1, cache information 15*b* having the file name "app1.html" exists as the page information. In the pieces of cache information 15*h* relating to application 1, cache information 15*b* having the file name "0.gif", cache information 15*b* having the file name "1.gif", cache information 15*b* having the file name "2.gif", and cache information 15*b* having the file name "logo.jpg" exist as the image data. As illustrated by the URLs in FIG. 10, the pieces of page information and image data are stored in a location of a hierarchy of "http://www.aaa.com/bbb/" or below. Application 1 can be used when the Web page is displayed based on "app1.html", and the images are displayed in the Web page based on the pieces of image data of "0.gif", "1.gif", "2.gif", and "logo.jpg".

Similarly, in the pieces of cache information 15*b* relating to application 2, cache information 15*b* having the file name "app2.html" exists as the page information. In the pieces of cache information 15*b* relating to application 2, cache information 15*b* having the file name "0.gif", cache information 15*b* having the file name "1.gif", cache information 15*b* having the file name "2.gif", and cache information 15*b* having the file name "logo.jpg" exist as the image data. As illustrated by the URLs in FIG. 10, the pieces of page information and image data are stored in a location of a hierarchy of "http://www.ddd.com/eee/" or below. Application 2 can be used when the Web page is displayed based on "app2.html", and the images are displayed in the Web page based on the pieces of image data of "0.gif", "1.gif", "2.gif", and "logo.jpg".

In cache database 15*a*, the application number is not provided to cache information 15*b* (for example, cache information 15*b* indicated by the file name "www.google.co.jp/" in FIG. 10), which is acquired with respect to the Web page that does not relate to the Web application. In the first embodiment, application management unit 51 manages only cache information 15*b*, which is acquired with respect to the Web page relating to the Web application, by providing the corresponding application number.

[Operation when Registration of Web Application is Cancelled]

In image forming apparatus 1, the registration of the Web application can be cancelled. When the registration of the Web application can be cancelled, cache information 15*b* corresponding to the Web application is deleted. For example, the registration is cancelled based on the manipulation input of a predetermined user (a manager, namely, a user who has management authority). That is, the predetermined user can delete the registered Web application from image forming apparatus 1. All the user may delete the application.

In the first embodiment, CPU 21 receives an instruction (cancel instruction) to cancel the registration of the Web application. The cancel instruction is issued such that the predetermined user performs the manipulation input through manipulation unit 11. When the cancel instruction is received, application management unit 15 performs processing for cancelling the registration of the Web application in response to the received cancel instruction. Cache management unit 55 deletes cache information 15*b* corresponding to the Web application in which the registration is cancelled by application management unit 51 in the stored pieces of cache information 15*h* in conjunction with the cancel of the registration by application management unit 51.

FIG. 11 is a sequence diagram illustrating the operation of image forming apparatus 1 when registration of the Web application is cancelled.

Referring to FIG. 11, in Step S401, the predetermined user (manager) issues the cancel instruction (application deletion request) through manipulation unit 11 when cancelling the registration of the Web application. The cancel instruction is received in image forming apparatus 1. For example, the cancel instruction includes an identifier (application ID) specifying the Web application that becomes the registration cancel target. The application ID may be one of a unique name, the application number, and the like of the Web application. For example, the manager may assign the Web application in which the registration is cancelled by specifying the icon of the Web application displayed on display panel 13. At this point, the application ID of the Web application specified by the manager is included in the cancel instruction. The manager may issue the cancel instruction by directly inputting the application ID through manipulation unit 11.

In Step S403, application management unit 51 cancels the registration of the Web application based on the received cancel instruction. The registration of the Web application corresponding to the application ID is cancelled based on the application ID included in the cancel instruction. Therefore, the Web application in which the registration is cancelled cannot be utilized unlike the case the Web application is registered.

In Step S405, application management unit 51 issues the instruction to delete cache information 15*b* corresponding to the Web application, in which the registration is cancelled, to cache management unit 55. The deletion instruction includes the application ID of the Web application in which the registration is cancelled.

In Step S407, cache management unit 55 receives the deletion instruction and performs cache management according to the deletion instruction. That is, cache management unit 55 deletes cache information 15*b* corresponding to the application ID included in the deletion instruction. Cache management unit 55 selectively deletes cache information 15*b* based on the information managed in cache database 15*a*, namely, the application number. Cache management unit 55 deletes the record corresponding to the application ID included in the deletion instruction in cache database 15*a*. Cache management unit 55 may similarly delete cache information on the Web page, which is acquired such that the screen transitions to another screen in operating the Web application.

In Step S409, cache management unit 55 transmits result information to application management unit 51 when the cache management is ended. Examples of the result information include the information on cancelled cache information 15*b* and the information indicating that the deletion is completed.

In Step S411, when receiving the result information from cache management unit 55, application management unit 51 notifies the manager of the result information and the cancel of the registration of the Web application. For example, application management unit 51 notifies the manager by displaying the result information on display panel 13. The manager who issues the cancel instruction can recognize that the registration of the Web application is cancelled and that cache information 15*b* is deleted by the notification.

Figure 12:
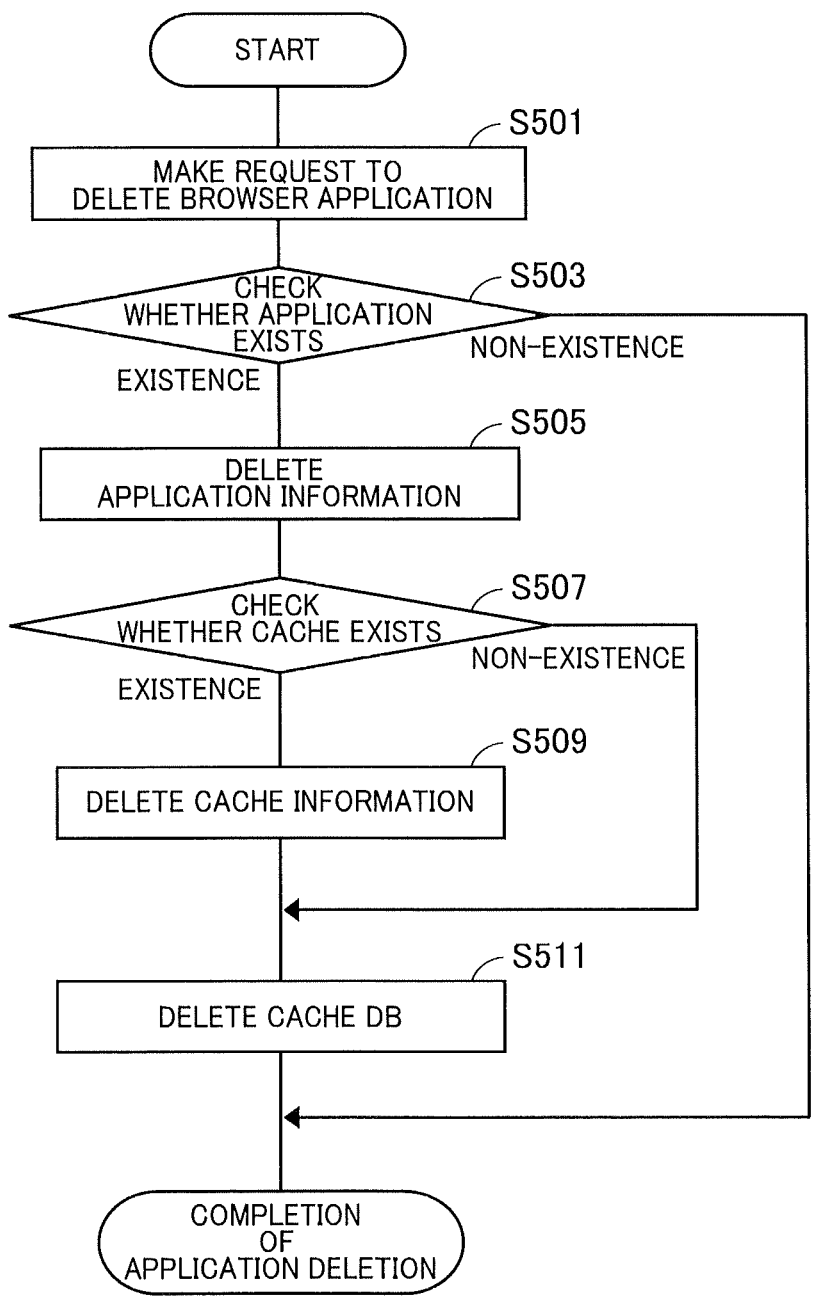
FIG. 12 is a flowchart illustrating the operation of the image forming apparatus when the registration of the Web application is cancelled.

FIG. 12 is a flowchart illustrating the operation of image forming apparatus 1 when the registration of the Web application is cancelled.

Referring to FIG. 12, in Step S501, CPU 21 receives the instruction to cancel the Web application (browser application).

In Step S503, CPU 21 checks whether the Web application that becomes the registration cancel target exists based on the cancel instruction. When the Web application that becomes the registration cancel target does not exist, the registration cancel (application deletion) operation is completed.

When the Web application that becomes the registration cancel target exists in Step S503, CPU 21 cancels the registration of the Web application in Step S505. When the registration of the Web application is cancelled, the information on the Web application, which is recorded in the database that manages the Web application in association with the registration, is deleted.

In Step S507, CPU 21 checks whether recorded cache information 15*b* on the Web application in which the registration is cancelled exists. For example, the check whether cache information 15*b* exists is made by referring to cache database 15*a*.

When cache information 15*b* exists in Step S507, CPU 21 deletes cache information 15*b* in Step S509.

When cache information 15*b* does not exist in Step S507, or when the processing in Step S509 is ended, CPU 21 manages cache database 15*a* in Step S511. That is, cache management unit 55 deletes the record of cache database 15a with respect to the Web application in which the registration is cancelled.

When the management of cache database 15a is ended, the sequence of operations in cancelling the registration of the Web application is ended. In FIG. 12, description of the processing for transmitting the result information on the processing performed by each of application management unit 51 and cache management unit 55 is omitted.

Figures 13, 14:
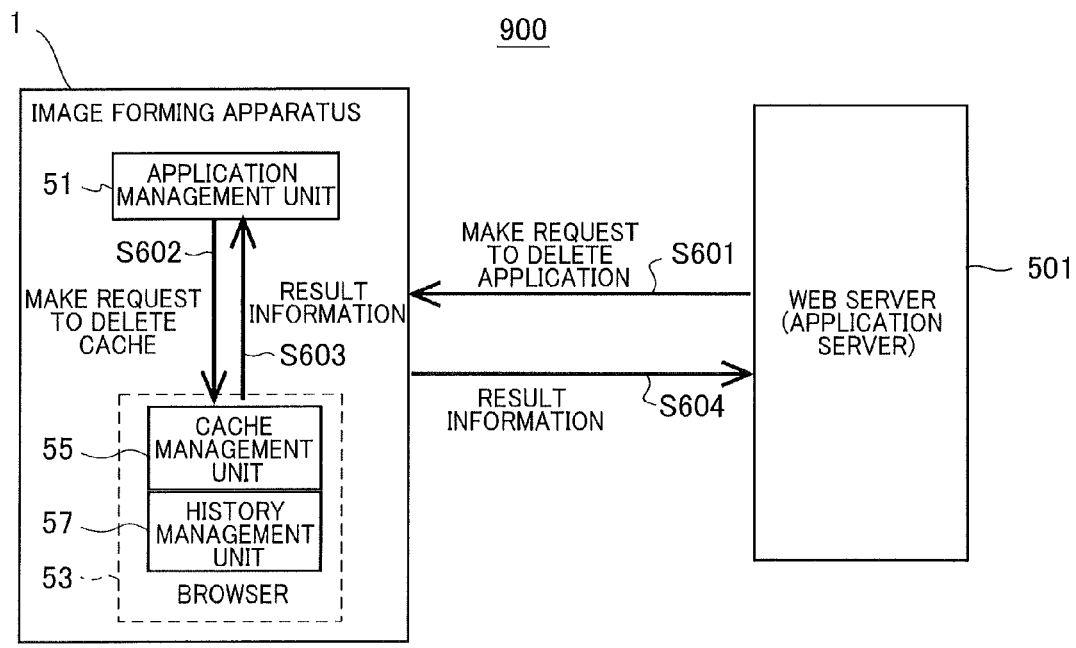
FIG. 13 is a second table illustrating an example of the cache database managed by the image forming apparatus.
FIG. 14 is a view illustrating an example of the operation of the image forming apparatus when the registration of the Web application is cancelled.

FIG. 13 is a second table illustrating an example of cache database 15a managed by image forming apparatus 1.

The table of FIG. 13 illustrates cache database 15a after the registration of the Web application (application 1) is cancelled while cache database 15a is in the state of the table of FIG. 10. When the registration of application 1 is cancelled, cache information 15b having the application number "1" corresponding to application 1 is deleted. In the records of cache database 15a, the record corresponding to cache information 15b having the application number "1" is deleted from cache database 15a. Therefore, the number of records is decreased in cache database 15a as illustrated in FIG. 13.

As described above, in the first embodiment, when the registration of the Web application is cancelled, cache management unit 55 deletes cache information 15b on the Web application in which the registration is cancelled and the record of cache database 15a. Accordingly, when the cache information on the Web application becomes unnecessary because the registration of the Web application is cancelled, it is not necessary that the user perform the manipulation input in order to delete the cache information, thereby reducing the burden on the user's manipulation. Because cache information 15b is deleted in conjunction with the cancel of the registration of the Web application, unnecessary cache information 15b is quickly deleted to release the resource of HDD 15. Because the relatively large remaining capacity can be ensured in HDD 15 of image forming apparatus 1, small-size HDD 15 can be used to reduce production cost of image forming apparatus 1.

[Description of Modification]

FIG. 14 is a view illustrating an example of the operation of image forming system 900 when the registration of the Web application is cancelled.

The external device, such as Web server 501, which can conduct communication with image forming apparatus 1 may issue the cancel instruction to image forming apparatus 1.

In image forming apparatus 1, history management unit 57 may delete the history information in conjunction with the deletion of cache information 15b by cache management unit 55. At this point, history management unit 57 may delete the history information corresponding to deleted cache information 15b in the pieces of history information. That is, history management unit 57 may delete the history information corresponding to the Web application in which the registration is cancelled in the pieces of history information. History management unit 57 may tentatively delete all the pieces of history information.

Referring to FIG. 14, in Step S601, controller 520 of Web server 501 transmits the cancel instruction (application deletion request) to image forming apparatus 1. The user may issue an instruction to transmit the cancel instruction to Web server 501, or the cancel instruction may automatically be transmitted according to various programs running on Web server 501. The cancel instruction may automatically be transmitted when a predetermined condition is satisfied, for example, on a set deadline date.

In Step S602, application management unit 51 transmits the instruction to cancel cache information 15b to Web browser 53 while cancelling the registration of the Web application. Cache management unit 55 deletes cache information 15b in response to the deletion instruction. History management unit 57 deletes the history information in response to the deletion instruction.

The pieces of processing in Steps S603 and S604 are similar to those in Steps S409 and S411. That is, cache management unit 55 transmits the result information to Web server 501 through application management unit 51. The result information is transmitted from application management unit 51 to Web server 501. At this point, the result information indicating that the history information is deleted by history management unit 57 may be transmitted to Web server 501 through application management unit 51.

In the case that Web server 501 issues the cancel instruction, Web server 501 can collectively cancel the registration of the Web application with respect to a plurality of image forming apparatuses 1, 201, and 301 in each of which the Web application is registered. When the registration of the Web application is cancelled, the cache information can be deleted according to the cancel of the registration in each of the image forming apparatuses 1, 201, and 301. Accordingly, the maintenance work of image forming system 900 can easily be performed.

As described above, the history information is deleted in conjunction with the cancel of the registration of the Web application, which allows the unnecessary information to be easily and quickly deleted. Accordingly, the large remaining capacity can be ensured in HDD 15, and Web browser 53 can be used while the unnecessary history information does not exist.

Second Embodiment

Because a basic configuration of an image forming system according to a second embodiment is substantially identical to that of the first embodiment, the description is not repeated. The second embodiment differs from the first embodiment in the following point. In each user who utilizes the image forming system, the registration of the Web application can be cancelled and the cache information can be deleted in conjunction with the cancel of the registration. In other words, the authority of the Web application can be changed in each user (such as the cancel of the use authority) and the cache information is deleted in conjunction with the authority change. The case that the cancel instruction (user authority change request) is issued such that a predetermined user performs the manipulation input to image forming apparatus 1 will be described below.

For example, the authority of the Web application authority is changed when the Web application provided by Web server 501 is set so as not to be able to be utilized with respect to the user who can login to image forming apparatus 1. In image forming apparatus 1, for example, the user whose authority of the registered Web application is changed cannot select the Web application even if the user displays the function selection screen. The user cannot utilize the Web application.

In the plurality of image forming apparatuses 1, 201, and 301, the authority of the user who logs in to image forming system 900 may be changed with respect to the Web application provided to the user by Web server 501. In the image forming apparatuses 1, 201, and 301, the authority of the user is collectively and easily changed by the one-time manipulation.

Cache database 15a managed by cache management unit 55 in the second embodiment will be described. In cache database 15a, cache management unit 55 manages the information on the correspondence relationship between cache information 15b and the Web application in each user identified by image forming apparatus 1.

FIG. 15 is a first table illustrating an example of cache database 15a managed by image forming apparatus 1 of the second embodiment.

Referring to FIG. 15, the second embodiment is similar to the first embodiment in that pieces of information of the file name, the URL, Application number, and the validated date are recorded in cache database 15a with respect to each file of cache information 15b while being correlated with one another. In the second embodiment, additionally information on a user ID is recorded with respect to each file.

The user ID is uniquely provided to the user who uses image forming apparatus 1 or image forming system 900 while the user ID and the user are correlated with each other. The user can be identified by the user ID. In the example of FIG. 15, a user (user 1) having a user ID "1" and a user (user 2) having a user ID "2" exist as the user who becomes the management target of cache information 15b.

When each user acquires the Web page by Web browser 53 in the login state, cache management unit 55 manages the page information on the Web page and the like while distinguishing between the users. For example, it is assumed that cache information 15b having the file name "app1.html" is acquired with respect to each of user 1 and user 2. In this case, in cache database 15a, cache information 15b having the file name "app1.html" is recorded as different records for user 1 and user 2.

In the example of FIG. 15, cache information 15b on application 1 having the application number "1" and cache information 15b on application 2 having the application number "2" are managed with respect to user 1. On the other hand, cache information 15b on application 1 having the application number "1" is managed with respect to user 2.

Figure 16:
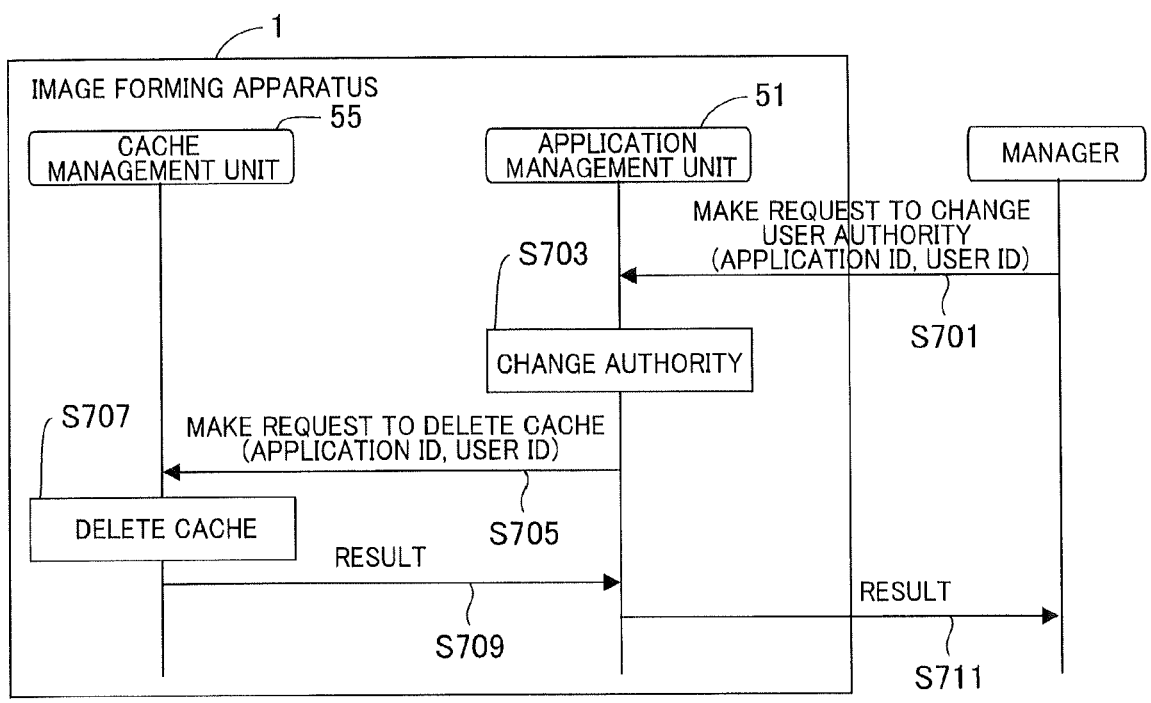
FIG. 16 is a sequence diagram illustrating the operation of the image forming apparatus of the second embodiment when authority of the Web application is changed.

FIG. 16 is a sequence diagram illustrating the operation of image forming apparatus 1 of the second embodiment when the authority of the Web application is changed.

Referring to FIG. 16, in Step S701, the predetermined user (manager) issues the cancel instruction through manipulation unit 11 when the authority of the Web application is changed with respect to the individual user who utilizes image forming system 900. In the second embodiment, for example, the cancel instruction includes the user ID in addition to the application ID. The application ID indicates the Web application that becomes the target of the authority change. The user ID indicates the user whose use authority is changed with respect to the Web application that becomes the target of the authority change.

In Step S703, application management unit 51 changes the authority of the user in response to the cancel instruction. Therefore, the user who becomes the target of the authority change cannot utilize the Web application. At this point, application management unit 51 may cancel the registration of the Web application in response to the cancel instruction. For example, when the Web application is registered in each user, the registration of the Web application may be cancelled with respect to the user whose user ID is included in the cancel instruction.

In Step S705, application management unit 51 issues the instruction to cancel the Web application that becomes the target of the authority change and cache information 15b corresponding to the user (cache deletion request) to cache management unit 55. The deletion instruction includes the application ID indicating the Web application that becomes the target of the authority change and the user ID indicating the user whose use authority is changed.

In Step S707, cache management unit 55 receives the deletion instruction, and performs the cache management in response to the deletion instruction. Cache management unit 55 selectively deletes cache information 15b based on the pieces of information managed in cache database 15a, namely, the application number and the user ID. Cache information 15b is deleted in each user and in each Web application. That is, cache management unit 55 deletes pieces of cache information 15b corresponding to the application ID and user ID, which are included in the deletion instruction. Cache management unit 55 also deletes the records corresponding to the application ID and user ID, which are included in the deletion instruction in cache database 15a.

The pieces of processing in Steps S709 and S711 are substantially similar to those in Steps S409 and S411. Cache management unit 55 transmits the result information to application management unit 51 when the cache management is ended. When receiving the result information from cache management unit 55, application management unit 51 notifies the user of the result information and the authority change of the Web application.

Figure 17:
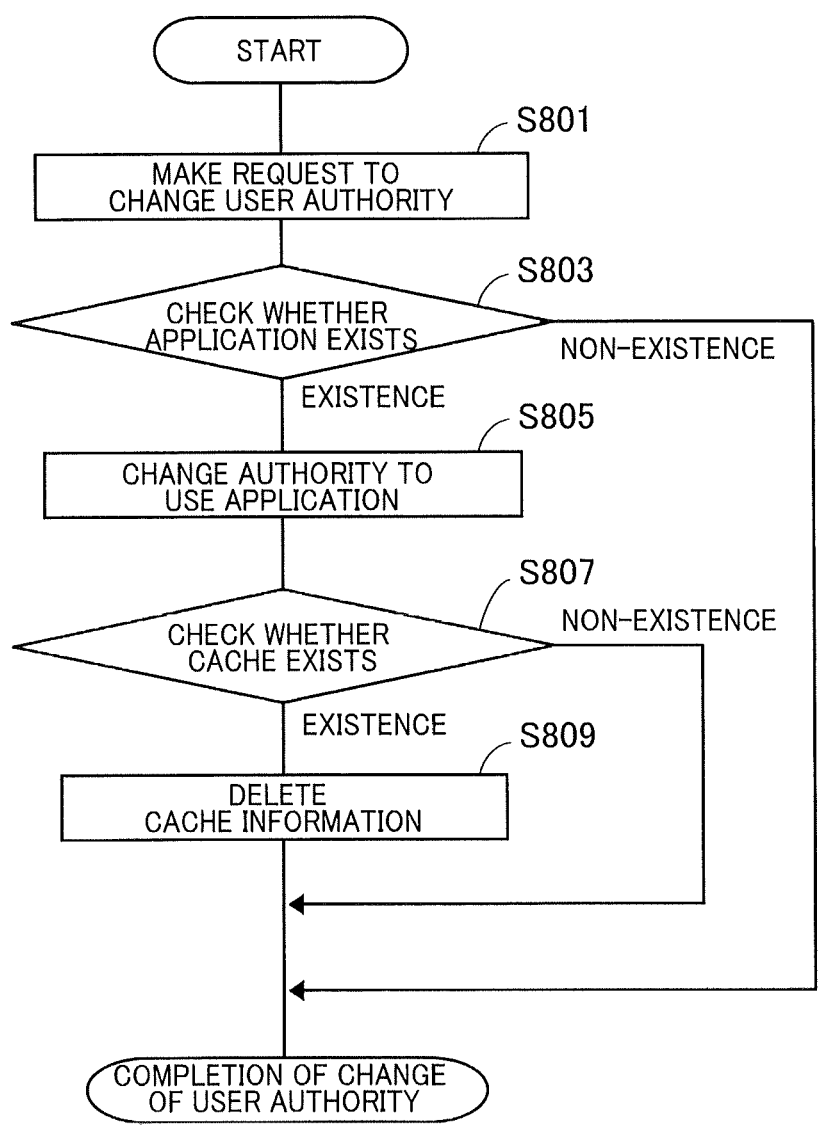
FIG. 17 is a flowchart illustrating the operation of the image forming apparatus when the authority of the Web application is changed.

FIG. 17 is a flowchart illustrating the operation of image forming apparatus 1 when the authority of the Web application is changed.

Referring to FIG. 17, in Step S801, CPU 21 receives the instruction to cancel the Web application (user authority change request).

In Step S803, CPU 21 checks whether the Web application that becomes the authority change target exists based on the cancel instruction. At this point, for example, CPU 21 checks whether the Web application is registered and whether the user of the authority change target can use the Web application. In other words, CPU 21 checks whether the use authority that is provided to the user with respect to the registered Web application exists. When the Web application that becomes the authority change target does not exist, the user authority change operation is completed.

When the Web application that becomes the authority change target exists in Step S803, CPU 21 changes the use authority of the Web application in Step S805.

In Step S807, CPU 21 checks whether cache information 15b on the user whose authority is changed exists in recorded pieces of cache information 15b on the Web application in which the authority is changed. For example, the check whether cache information 15b exists is made by referring to cache database 15a. When cache information 15b does not exist, the user authority change operation is completed.

When cache information 15b exists in Step S807, CPU 21 deletes cache information 15b in Step S809. When cache information 15b is deleted, the user authority change operation is completed.

FIG. 18 is a second table illustrating an example of cache database 15a managed by image forming apparatus 1 of the second embodiment.

The table of FIG. 18 illustrates cache database 15a after the use authority of the user is cancelled with respect to the Web application (application 1) while cache database 15a is in the state of the table of FIG. 15. Cache information 15b having the application number "1", which corresponds to application 1 and to user 1 whose use authority is cancelled, is deleted when the use authority is changed. In the records of cache database 15a, the record corresponding to cache information 15b having the application number "1", which corresponds to user 1, is deleted from cache database 15a. Therefore, the number of records is decreased in cache database 15a as illustrated in FIG. 18.

As described above, in the second embodiment, when the use authority of the Web application of the user is cancelled, cache management unit 55 deletes cache information 15b on the Web application in which the use authority is cancelled and the record of cache database 15a with respect to the user. The pieces of information, such as cache information 15b, which become unnecessary because the use authority of each user is changed is automatically deleted. Accordingly, the burden on the user's manipulation can be reduced, and small-size HDD 15 can be used. Unnecessary cache information 15b is quickly deleted in conjunction with the change of the use authority.

Figure 19:
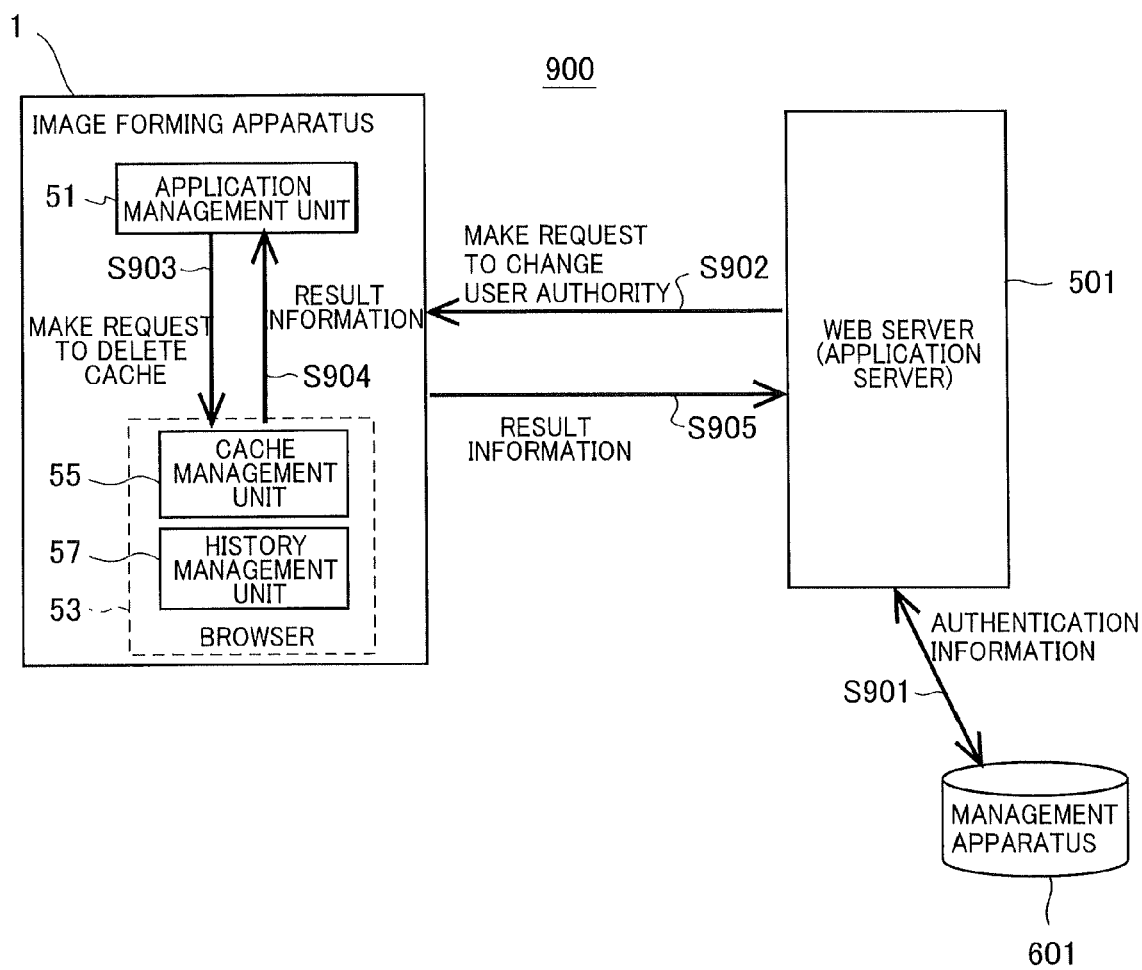
FIG. 19 is a view illustrating an example of the operation of the image forming apparatus when the authority of the Web application is changed.

FIG. 19 is a view illustrating an example of the operation of image forming system 900 when the authority of the Web application is changed.

In the second embodiment, similarly to the first embodiment, the external device, such as Web server 501, which can conduct communication with image forming apparatus 1 may issue the instruction to change the authority of the Web application to image forming apparatus 1. In the case that Web server 501 issues the cancel instruction, Web server 501 can collectively change the authority of the Web application with respect to a plurality of image forming apparatuses 1, 201, and 301 in each of which the Web application is registered. When the use authority of the Web application is cancelled, the cache information can be deleted according to the authority change with respect to the user whose use authority is cancelled in each of the image forming apparatuses 1, 201, and 301. Accordingly, the maintenance work of image forming system 900 can easily be performed.

Referring to FIG. 19, in Step S901, controller 520 of Web server 501 transmits and receives the authentication information to and from management apparatus 601. Therefore, in image forming system 900, the user authority is changed with respect to the Web application provided by Web server 501.

In Step S902, Web server 501 transmits the cancel instruction (user authority change request) to image forming apparatus 1 such that the user authority is changed in image forming apparatus 1.

In Step S903, application management unit 51 transmits the instruction to delete cache information 15b to Web browser 53 while changing the authority of the Web application. Cache management unit 55 deletes cache information 15b in response to the deletion instruction.

The pieces of processing in Steps S904 and S905 are identical to those in Steps S709 and S711 of FIG. 16. That is, cache management unit 55 transmits the result information to Web server 501 through application management unit 51. The result information is transmitted from application management unit 51 to Web server 501.

[Other]

The image forming system may be constructed by a proper combination of the above embodiments.

Whether the cache information relates to the Web application may be made based on whether a predetermined character is included in a part of the page name of the page information, the file name, or the URI in addition to the application number.

The cache information may be deleted after a while since the registration of the Web application is cancelled or the use authority is changed. For example, the cache information may be deleted after a predetermined time elapse or at the time the user performs the next manipulation input.

The Web application is not limited to the above Web application. One Web application may be provided from the plurality of Web servers constituting the image forming system. The plurality of Web applications may be provided from one Web server. The Web application may be provided by the image forming apparatus having the Web server function.

The image forming apparatus may determine that the instruction to cancel the registration of the Web application is received when the Web page of the Web application cannot be acquired while the registered Web application is activated. That is, when the Web application cannot be provided by the Web server, the image forming apparatus may receive the information indicating that the Web application cannot be provided as the cancel instruction from the Web server, and automatically delete the registration of the Web application.

The Internet may be used as the network that connects the Web server and the image forming apparatus in the communicable manner.

The image forming apparatus may be any of a black-and-white or color copier, printer, facsimile machine, or a multi-function peripheral (MFP) as a combination thereof. The image forming apparatus is not restricted to the one which forms images by electrophotography, but may be the one which forms images by a so-called inkjet system.

The processes according to the above embodiments may be performed by software or by using a hardware circuit.

A program for executing the processes according to the above embodiments may be provided as well. The program may be recorded on a recording medium, such as a CD-ROM, flexible disk, hard disk, ROM, RAM, memory card, or the like, so as to be provided to the user. The program may also be downloaded to the device via a communication line such as the Internet. The processes described in conjunction with the flowcharts above are executed by a CPU and the like in accordance with the program.

According to the invention, when the registration of the Web application is cancelled, the deletion unit deletes the cache information corresponding to the Web application in which the registration is cancelled in the pieces of cache information. Accordingly, the image forming apparatus and the image forming system for being able to easily delete the unnecessary cache information on the Web application can be provided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming system comprising a plurality of image forming apparatuses utilizing a Web application which is provided through a network, and an information processing device which can communicate with each of the plurality of image forming apparatuses, each of the image forming apparatuses comprising:

a user identification unit for identifying a user who uses said image forming apparatus;

a registration unit for registering the provided Web application;

a selection receiver for receiving an instruction to select the Web application registered by said registration unit;

an acquisition unit for acquiring information for performing said Web application in response to the selection instruction received by said selection receiver;

a storage in which the information acquired by said acquisition unit is stored as cache information;

a cache management unit for managing information indicating a correspondence relationship between said cache information stored in said storage and said Web application for each user identified by the user identification unit;

an authority management unit for managing information relating to use authority provided to said user identified by said user identification unit with respect to the Web application registered by said registration unit;

an authority cancel instruction receiver for receiving an instruction from the information processing device to cancel the use authority provided to said user with respect to the Web application;

an authority cancel unit for cancelling the use authority in each user based on the instruction received by the authority cancel instruction receiver; and a deletion unit for deleting the cache information that corresponds to the Web application in which the use authority is cancelled and corresponds to the user in whom said use authority is cancelled in pieces of cache information stored in said storage based on said information managed by said authority management unit and said information managed by said cache management unit when said authority cancel unit cancels the use authority that is provided to the user with respect to the Web application registered by said registration unit;

wherein said deletion unit deletes the cache information that corresponds to the Web application in which the use authority is cancelled and corresponds to the user in whom said use authority is cancelled in pieces of cache information stored in said storage, and maintains the registration of the Web application in which the use authority is cancelled;

the information processing device comprising:

a cancel instruction unit for collectively sending instructions to cancel the use authority of said Web application of said user to each of the plurality of image forming apparatuses included in the image forming system.

2. A method for controlling an image forming system comprising a plurality of image forming apparatuses utilizing a Web application which is provided through a network, and an information processing device which can communicate with each of the plurality of image forming apparatuses, the method comprising the steps of:

identifying a user who uses at least one of the plurality of image forming apparatuses;

registering the provided Web application;

receiving an instruction to select the registered Web application;

acquiring information for performing the Web application in response to the instruction selecting the registered Web application;

storing the acquired information as cache information;

managing cache correspondence information indicating a correspondence relationship between the stored cache information and said Web application for each identified user;

managing use authority information relating to use authority provided to said identified user with respect to the registered Web application;

receiving a cancellation instruction from the information processing device to cancel the use authority provided to said user with respect to the Web application;

cancelling the use authority in each user based on the received cancellation instruction;

deleting the cache information that corresponds to the Web application in which the use authority is cancelled and corresponds to the user in whom said use authority is cancelled in stored pieces of cache information, said deletion being based on the use authority information and the cache correspondence information when the use authority provided to the user with respect to the registered Web application is canceled;

wherein said deletion of the cache information deletes the cache information that corresponds to the Web application in which the use authority is cancelled and corresponds to the user in whom said use authority is cancelled in pieces of stored cache information, and maintains the registration of the Web application in which the use authority is cancelled; and collectively sending instructions to cancel the use authority of said Web application of said user to each of the plurality of image forming apparatuses included in the image forming system.

* * * * *